US012088771B2

(12) United States Patent
Okazaki et al.

(10) Patent No.: US 12,088,771 B2
(45) Date of Patent: Sep. 10, 2024

(54) CONSUMABLES COLLECTION INFORMATION MANAGEMENT SYSTEM

(71) Applicant: BROTHER KOGYO KABUSHIKI KAISHA, Nagoya (JP)

(72) Inventors: Naoya Okazaki, Hashima (JP); Masahiro Hayashi, Anjo (JP); Satoru Oki, Nagoya (JP); Tetsunori Mori, Kariya (JP); Taichiro Kimoto, Nagoya (JP); Sadaaki Miyazaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/326,614

(22) Filed: May 31, 2023

(65) Prior Publication Data
US 2023/0388434 A1 Nov. 30, 2023

(30) Foreign Application Priority Data

May 31, 2022 (JP) .................................. 2022-089288

(51) Int. Cl.
*H04N 1/44* (2006.01)
*G06F 21/60* (2013.01)
*H04N 1/00* (2006.01)

(52) U.S. Cl.
CPC ......... *H04N 1/4426* (2013.01); *G06F 21/608* (2013.01); *H04N 1/00363* (2013.01); *H04N 1/00477* (2013.01)

(58) Field of Classification Search
None
See application file for complete search history.

(56) References Cited

U.S. PATENT DOCUMENTS

| 7,313,602 B2 | 12/2007 | Ono et al. | |
| 2003/0097310 A1* | 5/2003 | Ono | G06Q 30/02 |
| | | | 705/14.27 |
| 2021/0237494 A1* | 8/2021 | Mikami | B41J 29/38 |
| 2021/0303238 A1 | 9/2021 | Minamiyama | |
| 2021/0373826 A1 | 12/2021 | Sueshige | |

FOREIGN PATENT DOCUMENTS

| JP | 2005-165593 A | 6/2005 |
| JP | 2009-211644 A | 9/2009 |

OTHER PUBLICATIONS

Partial European Search Report dated Sep. 8, 2023 from related EP 23 17 5800.4.
Extended European Search Report dated Dec. 11, 2023 from related EP 23 17 5800.4.

* cited by examiner

*Primary Examiner* — Andrew H Lam
(74) *Attorney, Agent, or Firm* — Scully, Scott, Murphy & Presser, P.C.

(57) ABSTRACT

An information management system includes: an information handling apparatus; and an information management apparatus which communicates with the information handling apparatus via a network. The information handling apparatus executes: an identification information obtaining process; and an identification information sending process. The information management apparatus executes: an identification information receiving process; a recipient associating process; a collection information obtaining process; a privilege information generating process; a recipient determining process; and a privilege information granting process.

5 Claims, 16 Drawing Sheets

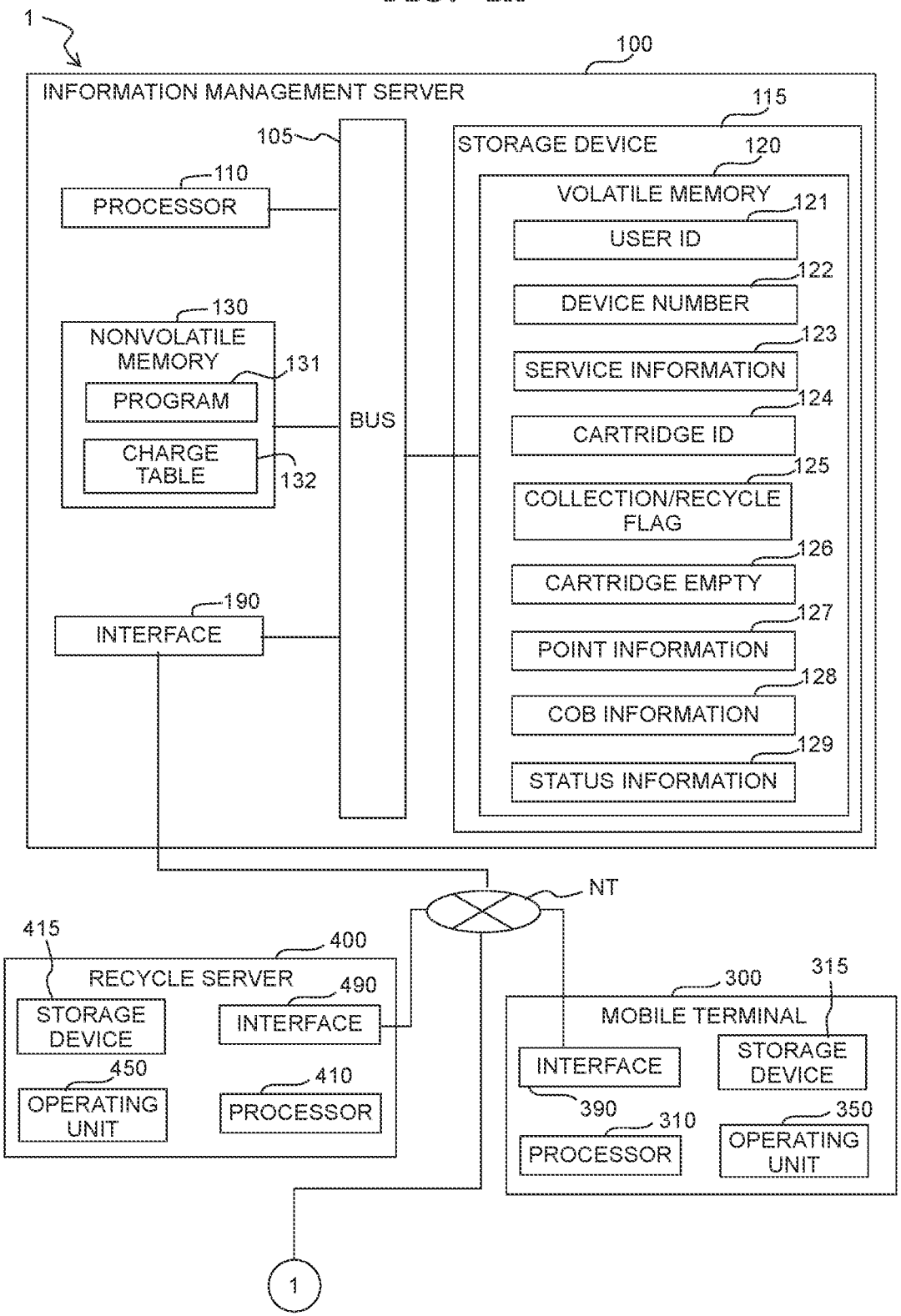

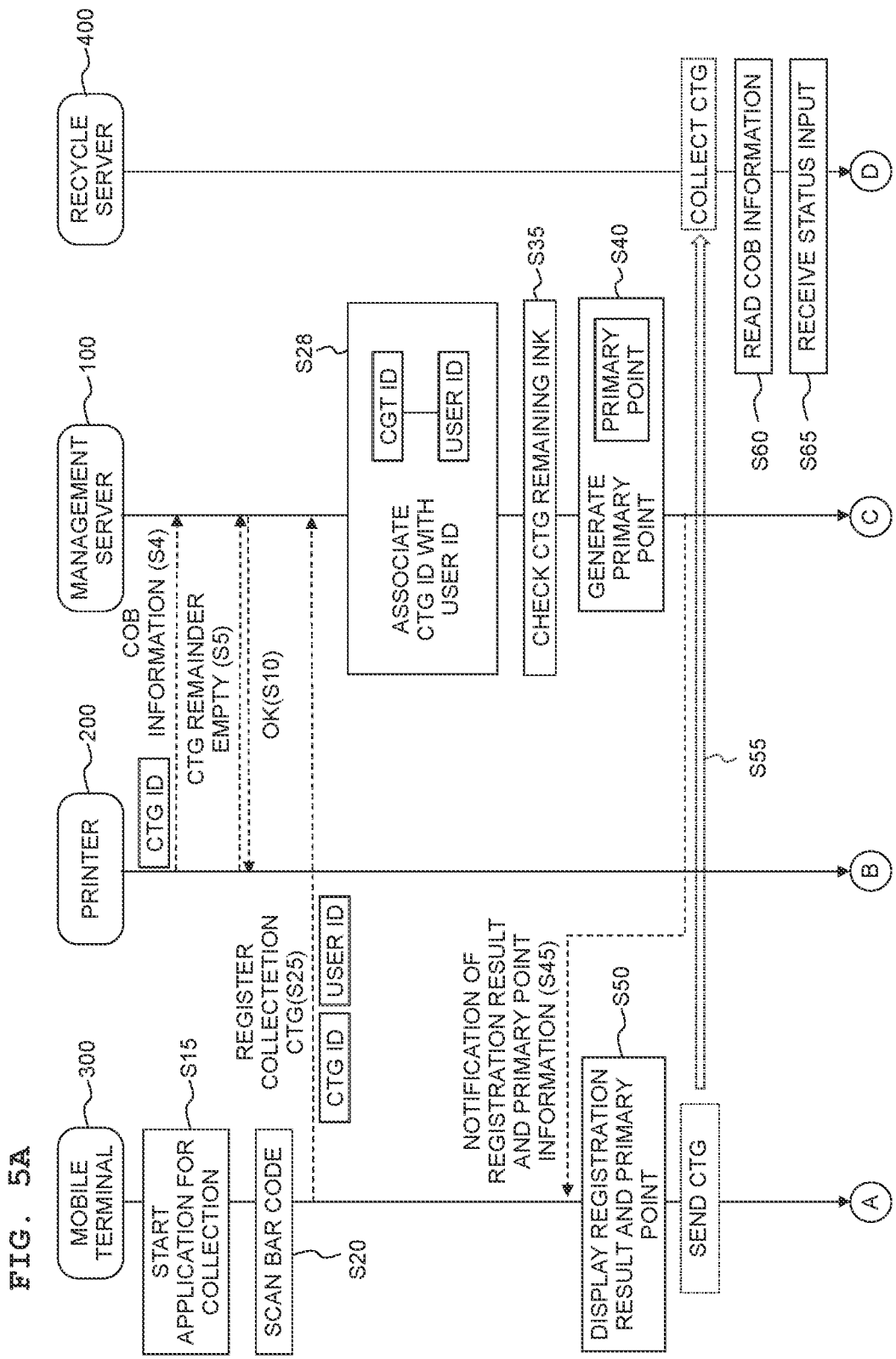

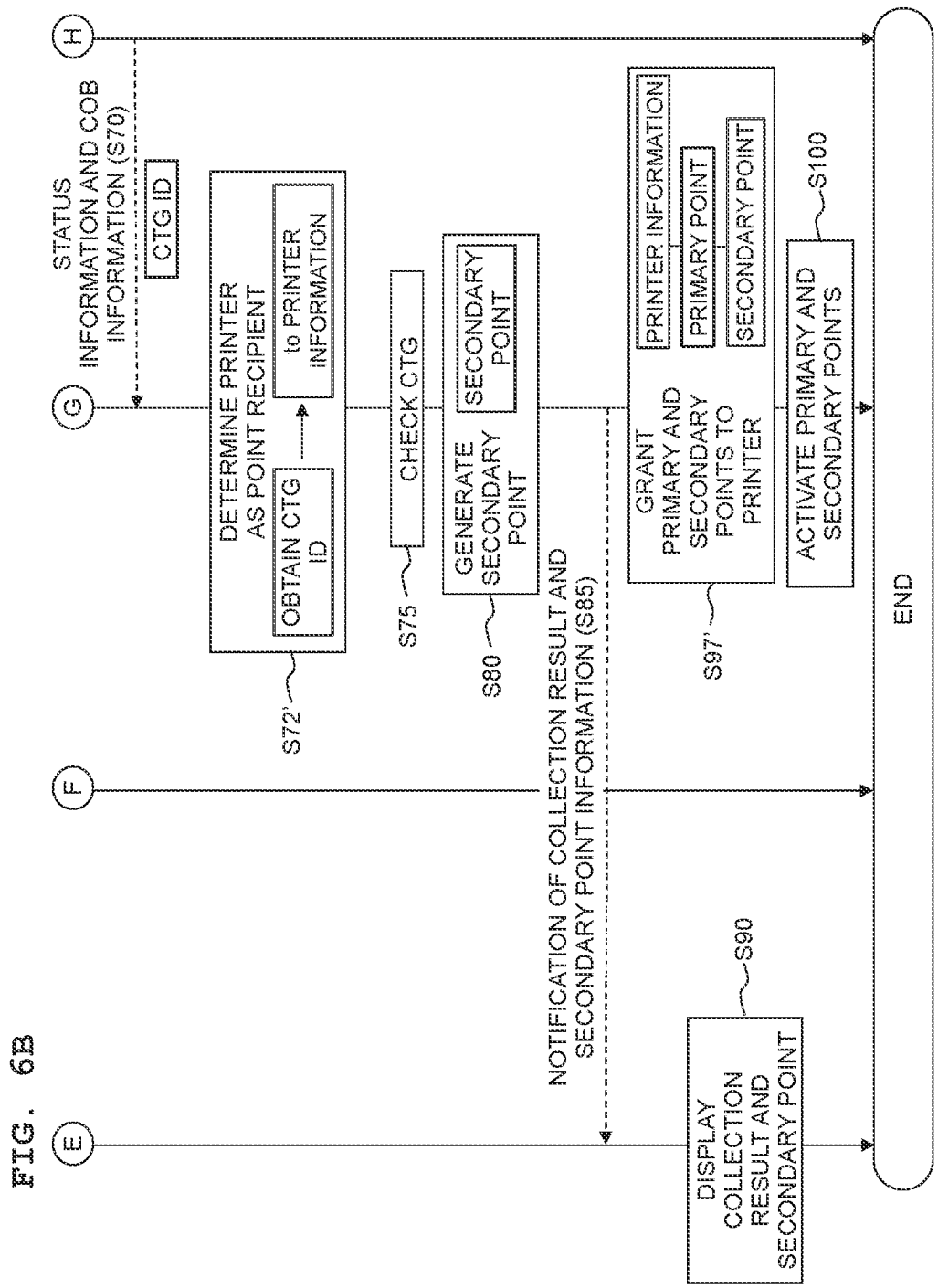

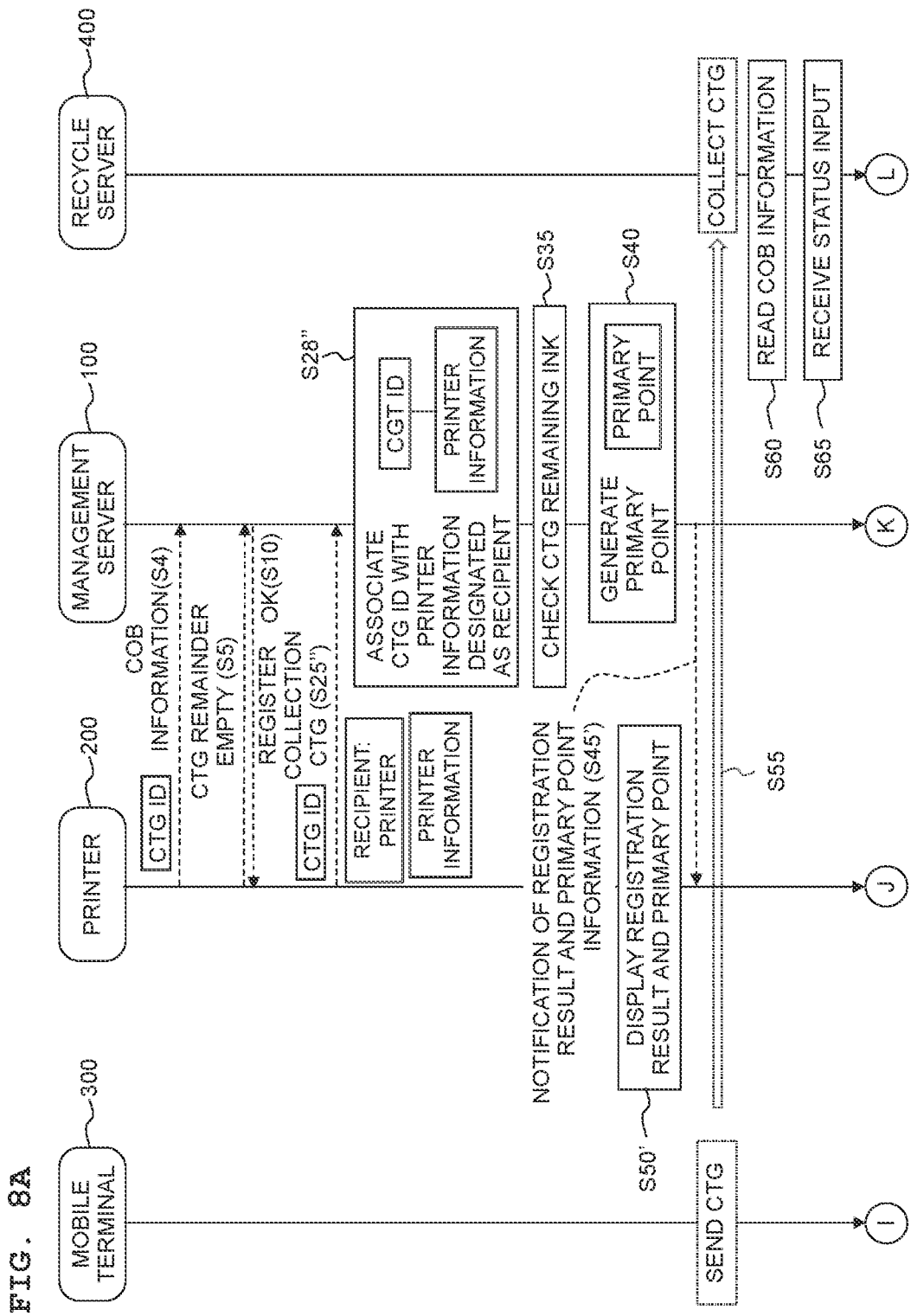

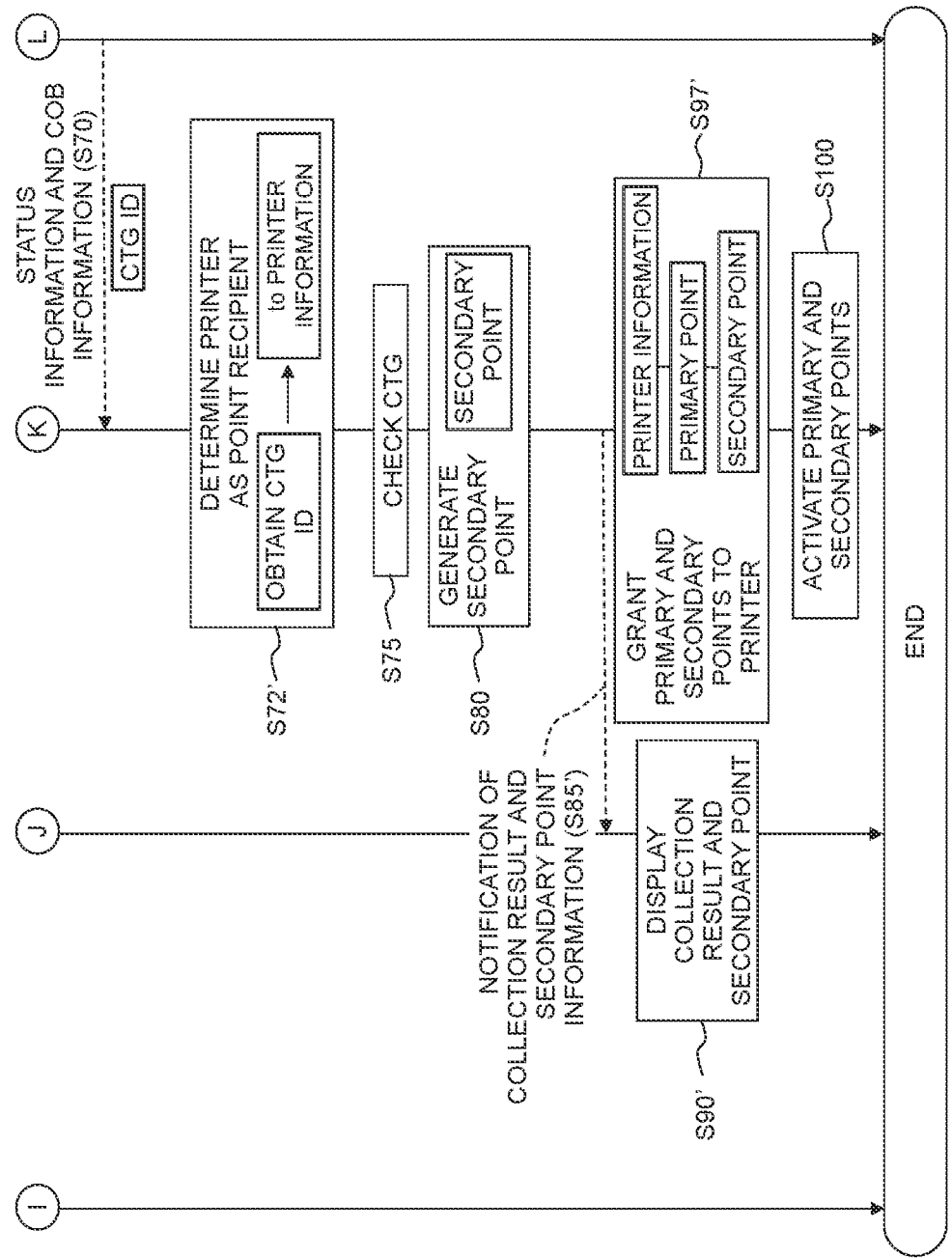

CONSUMABLES COLLECTION INFORMATION MANAGEMENT SYSTEM

REFERENCE TO RELATED APPLICATION

This application claims priority from Japanese Patent Application No. 2022-089288 filed on May 31, 2022. The entire content of the priority application is incorporated herein by reference.

BACKGROUND ART

Conventionally, there is known a service in which if a consumable cartridge is collected by a collection destination after use and the consumable cartridge is reused in a printing apparatus, discount rate of a reuse price as a privilege is increased according to the number of times the cartridge is reused. In this conventional service, a user ID for identifying a user is stored in a memory of a cartridge when the cartridge is used, and when the cartridge is collected, the user is specified by using the user ID stored in the memory and a privilege is granted to the user.

DESCRIPTION

In the conventional service described above, it is not taken into consideration that the user may need to trace the factors for granting the privilege when the privilege is granted.

Now consider a new case where the user uses multiple consumables sequentially in the printing apparatus. In this case, the user may need to trace which collection of the consumables resulted in the grant of the privilege. However, in the above method, the user ID is stored in the memory of the consumables and the same user ID is stored in each of the multiple consumables. Therefore, although a user to be granted the privilege can be specified when each of the consumables is collected, the privilege to be granted cannot be associated with each of the consumables individually. In addition, in the above method of storing the user ID in the memory of the consumables, it is difficult to prevent user information from being extracted from the collected consumables and used illegally by a malicious third party.

An object of the present teaching is to provide an information management system and a printing apparatus which can associate privilege to be granted by collection of consumables with the consumables assuredly and can prevent user information from being used illegally during the collection.

According to an aspect of the present teaching, there is provided an information management system, including:
  an information handling apparatus configured to handle consumables identification information for identifying consumables to be used in printing by a printing apparatus; and
  an information management apparatus configured to communicate with the information handling apparatus via a network,
  wherein the information handling apparatus is configured to execute:
    an identification information obtaining process for obtaining the consumables identification information of one of the consumables; and
    an identification information sending process for sending the consumables identification information obtained in the identification information obtaining process to the information management apparatus, and
  the information management apparatus is configured to execute:
    an identification information receiving process for receiving the consumables identification information sent in the identification information sending process;
    a recipient associating process for associating the consumables identification information received in the identification information receiving process with a recipient to be granted privilege information relating to the printing by the printing apparatus;
    a collection information obtaining process for obtaining collection information of the one of the consumables in a collection destination of the consumables;
    a privilege information generating process for generating the privilege information in response to the collection information obtained in the collection information obtaining process;
    a recipient determining process for determining a recipient of the privilege information with respect to the consumables identification information included in the collection information, in reference to an association result in the recipient associating process; and
    a privilege information granting process for granting the privilege information generated in the privilege information generating process associating with the recipient determined in the recipient determining process.

According to the present teaching, the consumables identification information is held by the consumables, and the information management system includes the information handling apparatus configured to handle the consumables information and the information management apparatus configured to communicate with the information handling apparatus. The information handling apparatus executes the identification information obtaining process to obtain the consumables identification information of one of the consumables. The obtained consumables identification information is sent to the information management apparatus. The information management apparatus executes the identification information receiving process, the recipient associating process, the collection information obtaining process, the privilege information generating process, the recipient determining process, and the privilege information granting process. The consumables identification information sent from the information handling apparatus in the identification information sending process is received by the information management apparatus in the identification information receiving process, and the received consumables identification information is associated with the recipient of the privilege information in the recipient associating process.

When a used consumables is collected by a predetermined collection destination, the collection information from the collection destination is obtained in the collection information obtaining process, and privilege information such as so-called points is generated in the privilege information generation process in response to obtaining the collection information. The collection information from the collection destination includes the consumables identification information of the collected consumables. In the recipient determining process, the recipient of the corresponding privilege is determined by referring to the results of the association in the recipient associating process with respect to the consumables identification information of the collected consumables. In the privilege information granting process, the generated privilege information is granted in a manner that is associated with the determined recipient.

In the present teaching, the privilege information is generated by using the consumables identification information held in the consumables, and the generated privilege information is granted to the recipient determined by using the consumables identification information. According to the present teaching, the consumables and the corresponding privilege information are associated with each other one to one, so that the user can trace which consumables collection resulted in the privilege, which improves the user's satisfaction. In addition, by using the consumables identification information retained in the consumables, there is no need to store user information in the memory of the consumables. Accordingly, there is no risk that a third party will extract the user information from the consumables during collection and use the user information illegally.

According to the present teaching, it is possible to associate privilege to be granted by collection of consumables with the consumables assuredly and prevent user information from being used illegally during the collection.

FIGS. 1A and 1B are a functional block diagram representing overall schematic configuration of a printing service delivery system according to one embodiment of the teaching.

FIGS. 5A and 5B are a sequence chart depicting an example of a control procedure performed by the mobile terminal, an information management server, a recycle server, and a printer working together.

FIGS. 6A and 6B are a sequence chart depicting an example of a control procedure performed by the mobile terminal, the information management server, the recycle server, and the printer working together in a modified example where a point recipient is the printer.

FIGS. 8A and 8B are a sequence chart depicting an example of a control procedure performed by the mobile terminal, the information management server, the recycle server, and the printer working together.

An embodiment of the present teaching will be described with reference to the drawings.

Figure 1B:
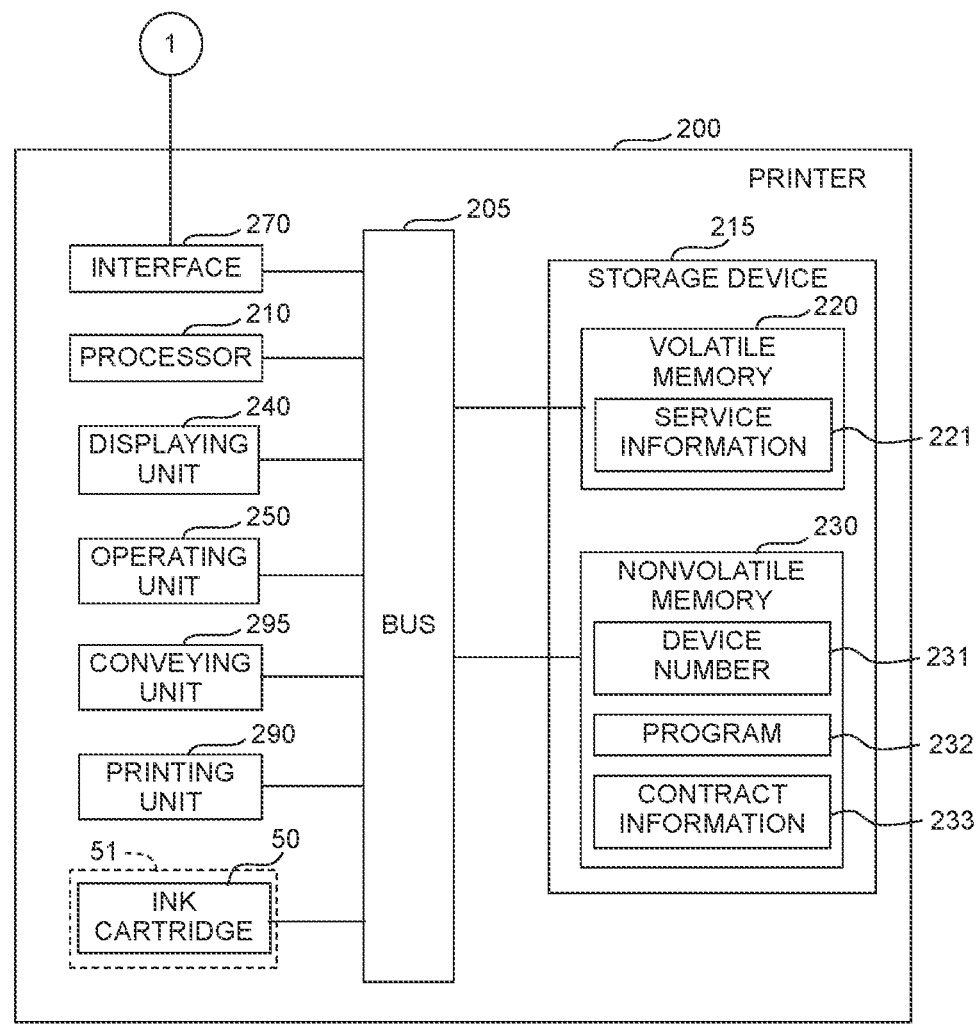

A printing service delivery system according to the embodiment is depicted in FIGS. 1A and 1B. This embodiment is an embodiment in which a prepaid printing service (hereinafter referred to as "prepaid printing service" as appropriate) is applied to a printing service delivery system 1. In the prepaid printing service, a user as a customer pays a fee in advance to use printing functions of a printer. The printing service delivery system is an example of an information management system.

Outline of Printing Service Delivery System

As depicted in FIGS. 1A and 1B, the printing service delivery system 1 includes an information management server 100, a printer 200, a mobile terminal 300, and a recycle server 400. The information management server 100, the printer 200, the mobile terminal 300, and the recycle server 400 are connected to a network NT and can communicate with each other.

Management Server

The information management server 100 is a server installed and managed by a manufacturer of the printer 200, for example. The information management server 100 has a processor 110, a storage device 115, and an interface 190. The processor 110, the storage device 115, and the interface 190 are connected to each other via a bus 105. The information management server 100 is an example of an information management apparatus. The information management server 100 may be configured as a collection of multiple servers.

The storage device 115 has a volatile memory 120 and a nonvolatile memory 130. The volatile memory 120 is, for example, a DRAM and has a user ID storage area 121, a device number storage area 122, a service information storage area 123, a cartridge ID storage area 124, a collection/recycle flag storage area 125, a cartridge empty information storage area 126, a point information storage area 127, a COB information storage area 128, and a status information storage area 129. The details of these storage areas 121-129 are described below.

The nonvolatile memory 130 is, for example, a hard disk drive or a solid state drive and has a program storage area 131 and a charge table storage area 132. The program storage area 131 stores various programs. The various programs include various programs related to delivery of the printing service based on a software block diagrams in FIGS. 3, 7, 9 and sequence diagrams in FIGS. 5A, 5B, FIGS. 6A, 6B, FIGS. 8A, 8B, and FIGS. 10A to 10C, etc. described below. The charge table storage area 132 stores, for example, predetermined correlations for calculating the fees charged to the user corresponding to the number of sheets to be made available for printing when the aforementioned prepaid printing service contract has been concluded.

The processor 110 is a data processing device such as a CPU, and executes various programs, including programs related to the printing service, stored in the program storage area 131. The processor 110 performs various processes depicted in FIGS. 5A, 5B, FIGS. 6A, 6B, FIGS. 8A, 8B, FIGS. 10A to 10C, etc. below, including data communications to the mobile terminal 300, the printer 200, and the recycle server 400, etc. connected to the network NT. The processor 110 cooperates with the printer 200, the mobile terminal 300, the recycle server 400, etc. to execute the processing methods related to generation and grant of points and various identification information as described below by the print service delivery system 1 of this embodiment.

The interface 190 is a wired LAN interface or a wireless interface for communicating with other apparatus and is connected to the network NT. Interface 190 is an example of a communication interface.

The storage device 115 is not limited to the above configuration, but may be configured with, for example, RAM, ROM, EEPROM (EEPROM is a registered trademark of Renesas Electronics Corporation), HDD, a portable storage medium such as a USB memory attached to or detached from the mobile terminal 300, a buffer of the processor 110, or a combination thereof. The nonvolatile memory 130 is a computer-readable storage medium. A computer-readable storage medium is a non-transitory medium. The non-transitory medium includes recording medium such as CD-ROM, DVD-ROM, etc., in addition to the above examples. The non-transitory medium is also a tangible medium. The same applies to the storage device 215 of the printer 200 described below.

Printer

The printer 200 is owned, for example, by a printing service provider of the above printing services or a user. The printer 200 has a printing unit 290, a conveying unit 295, a processor 210, a storage device 215, a displaying unit 240, an operating unit 250, and an interface 270. The printing unit 290, the processor 210, the storage device 215, the displaying unit 240, the operating unit 250, and the interface 270 are connected to each other via a bus 205. The printer 200 is an example of a printer.

The storage device 215 includes a volatile memory 220 and a nonvolatile memory 230. The volatile memory 220 is, for example, a DRAM and has a service information storage area 221 that stores management service information as described below. The nonvolatile memory 230 is, for example, a flash memory and has a device number storage area 231, a program storage area 232, and a contract information storage area 233 for storing details of contract signed by the user with a contract source. The device number storage area 231 stores a device number as an example of identification information of the printer 200. As another example of the device number, a MAC address may be used. The identification information of the printer 200 is hereinafter referred to as "printer information". Various programs are stored in the program storage area 232. The various programs include various programs related to the delivery of the printing service of this embodiment based on the software block diagrams in FIGS. 3, 7, 9, and the sequence diagrams in FIGS. 5A, 5B, FIGS. 6A, 6B, FIGS. 8A, 8B, FIGS. 10A to 10C, etc. described below. These programs are stored in advance in the program storage area 232 as firmware, for example.

The processor 210 is a data processing device such as a CPU. The processor 210 executes various programs stored in the program storage area 232, and cooperates with the processor 110, the mobile terminal 300, the recycle server 400, etc. to execute the processing methods related to the generation and grant of points and various identification information described below.

The displaying unit 240 is, for example, a liquid crystal display and can display various information. The displaying unit 240 does not have to be the liquid crystal display, for example, it can be a dedicated LED lamp. The operating unit 250 is a device that receives operations by the user. The user can input various instructions to the printer 200 by operating the operating unit 250. The interface 270 is a wired or wireless network interface for communicating with other apparatus and is connected to the network NT.

The conveying unit 295 picks up paper sheets in the paper feeding tray and conveys the paper sheets along a predetermined conveying path.

The printing unit 290 forms images on the paper sheets conveyed by the conveying unit 295 using a predetermined method. The following description will take the case where the images are formed by an inkjet method as an example. The printing unit 290 forms images on the paper sheets by using ink from an ink cartridge 50, which is detachably installed in the cartridge holder 51, in response to a print job. The print job is sent from the mobile terminal 300 together with an execution instruction of the print job (hereinafter simply referred to as "print instruction" as appropriate), or is generated by the printing unit 290 based on an operation to the operating unit 250. The ink cartridge 50 is an example of the consumables, the cartridge holder 51 is an example of the installation section, and a paper sheet is an example of the printing medium.

Mobile Terminal

The mobile terminal 300 is a portable terminal such as a smartphone owned by the user, and is an example of a terminal device. The mobile terminal 300 is connected to the network NT via wireless communication. The mobile terminal 300 has an operating unit 350 which can be operated and input by the user as appropriate, a processor 310, a storage device 315, and an interface 390 for connecting to the network NT.

Various programs are stored in a program storage area (not depicted) provided in the storage device 315. The various programs include various programs related to the delivery of the printing service of this embodiment based on the software block diagrams in FIGS. 3, 7, 9, the sequence diagrams in FIGS. 5A, 5B, 6A, 6B, 8A, 8B, 10A to 10C, etc. described below. In a user ID storage area (not depicted) provided in the storage device 315, identification information of the user of the mobile terminal 300, such as a user ID or user account (hereinafter simply referred to as "user ID" as appropriate), is stored. The processor 310 executes the programs related to the printing service stored in the above program storage area. The processor 310 executes various processes depicted in FIGS. 5A, 5B, 6A, 6B, 8A, 8B, 10A to 10C, etc. below, including data communication to the information management server 100, the printer 200, the recycle server 400, etc. connected to the network NT. The processor 310 cooperates with the information management server 100, the printer 200, the recycle server 400, etc. to execute the processing methods related to the generation and grant of the points and various identification information described below by the print service delivery system 1 of this embodiment.

Figure 4A:
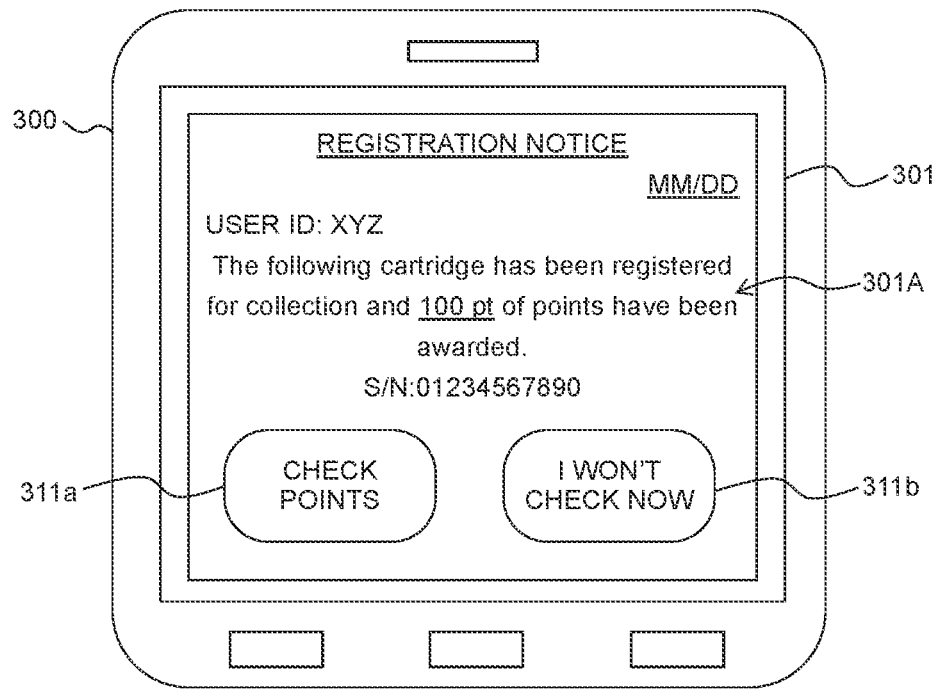
FIGS. 4A and 4B are illustrations of display screens for a registration notice and a collection notice which are displayed on a displaying unit of a mobile terminal.
Figure 4B:
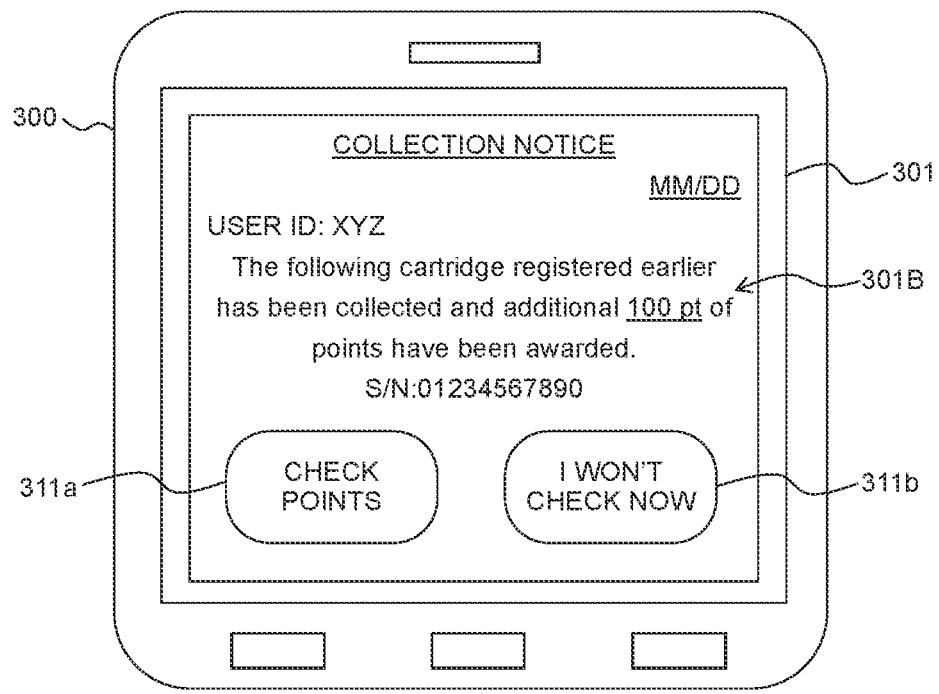

The mobile terminal 300 also includes a displaying unit 301 (see FIG. 4A, FIG. 4B, etc.). Examples of the displaying contents of the displaying unit 301 are described below. The mobile terminal 300 also has a reader (not depicted) capable of performing optical reading using known methods. Details of processes of the mobile terminal 300 using the reader are described below. Instead of the mobile terminal 300, other terminal devices such as a personal computer, a tablet computer, or the like may be used. Hereinafter, these information terminals will be collectively referred to simply as "mobile terminal 300" as appropriate.

Recycle Server

The recycle server 400 is provided, for example, by a recycle company who collects ink cartridges 50 for recycle and reuse, or an intermediary who acts as an intermediary to the recycle company (hereinafter simply referred to as "recycle company"). Details of the recycle and reuse of ink cartridges 50 are described below.

The recycle server 400 is connected to the network NT via wireless communication. The recycle server 400 has an operating unit 450 which can be operated and input by a person in charge of operations at the recycle server 400, a processor 410, a storage device 415, and an interface 490 for connecting to the network NT.

Various programs are stored in the program storage area (not depicted) provided in the storage device 415. The various programs include various programs related to the delivery of the printing service based on the software block diagrams in FIGS. 3, 7, 9, the sequence diagrams in FIGS. 5A, 5B, 6A, 6B, 8A, 8B, 10A to 10C, etc. described below. The processor 410 executes the programs related to the printing service stored in the above program storage area. The processor 410 executes various processes depicted in FIGS. 5A, 5B, etc., including data communication to the information management server 100, etc. connected to the network NT. The processor 410 executes the various processing methods described below by the print service provision system 1 in cooperation with the information management server 100, etc. The recycle server 400 also configures a recycle system including a reading apparatus (not depicted) capable of executing optical reading by known methods. Details of the process of the recycle server 400 as a recycle system using the reading apparatus are described below.

Prepaid Printing Service

As described above, the system provides a prepaid printing service in which the user pays a fee based on a usage contract in advance to use the printing functions of the printer 200. The service processing section 530 of the information management server 100 accepts the prepaid printing service application from the mobile terminal 300, and the prepaid printing service is applied to the printer 200. In other words, this is a pay-as-you-go service in which the user purchases printing privileges for the printer 200 via the mobile terminal 300 for a fee in advance and can print only the number of sheets guaranteed by the printing privileges. For example, the number of sheets which can be printed may be guaranteed by the printing privileges which can be obtained free of charge at the time of purchase of the printer 200. There may also be both fee-based printing privileges and free printing privileges.

Charge Amount and Charged Number of Sheets

In a case of a prepaid fee system, the user can print according to the number of printable sheets (hereinafter simply referred to as "charged number of sheets") guaranteed by the printing privilege obtained by the amount paid as the charge price (hereinafter simply referred to as "charge amount"). In this case, for example, based on a charge table stored in the charge table storage area 132 of the information management server 100, multiple charge plans are presented to the user, each specifying how many printable sheets can be obtained by paying how much, and the user selects a desired charge plan from the charge plans.

Recycle of Ink Cartridges

On the other hand, in recent years, from the viewpoint of environmental protection and ecology, reuse of consumables such as the ink cartridges 50 is being attempted. In the case of reusing ink cartridges 50, recycling is usually performed at a dedicated recycle plant owned by the recycle company.

Figure 2:
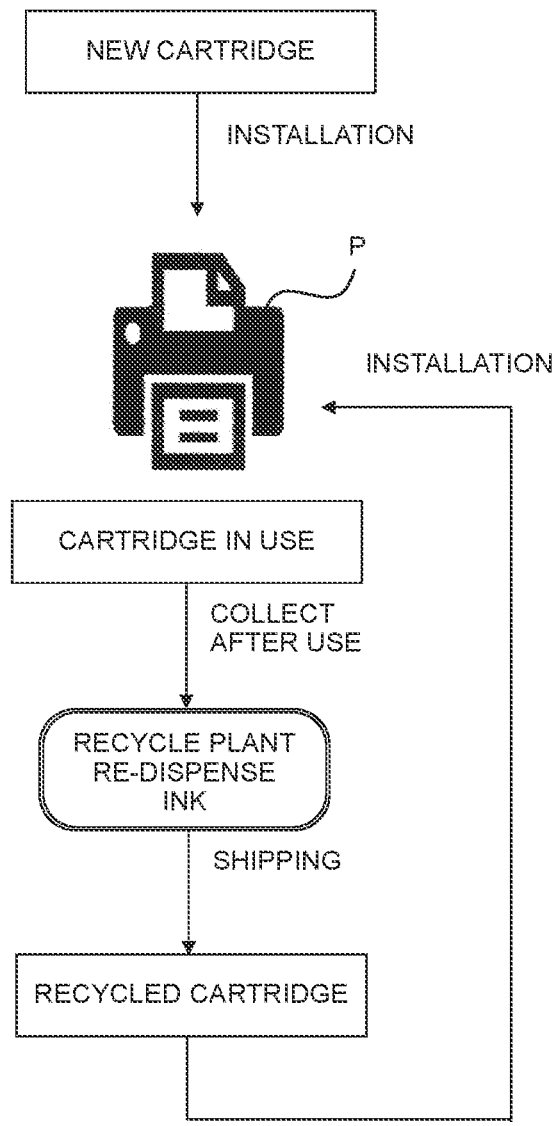
FIG. 2 illustrates an ink cartridge recycle process and reuse flow.

Specifically, as depicted in FIG. 2, when a new ink cartridge 50 is installed and used in a printer P including the printer 200. When the ink is used and the ink cartridge 50 is empty, the ink cartridge 50 is collected to the recycle plant by the recycle company. At the recycle plant, ink is re-dispensed into the ink cartridge 50, and the ink cartridge 50 is shipped as a recycled product, or a reused product, which can be used by the user again. The aforementioned recycle server 400 is located at the recycle plant.

In this embodiment, in order to promote the above reuse, points are granted as a privilege to the user who offers a used ink cartridge 50 for collection by the recycle company. In this case, the user pre-registers the fact that he/she sends and offers the ink cartridge 50 which he/she wishes to collect, for authentication of the ink cartridge 50 on the recycle server 400 and the information management server 100, and primary points are firstly granted at that time. Then, when the recycle server 400 confirms that the sent ink cartridge 50 has arrived at the recycle plant, secondary points are subsequently granted. The primary and secondary points are then returned to the user in some form of benefit at an appropriate time thereafter. For example, the primary and secondary points can be used as an addition to the charged number of sheets described above.

Software Block Configuration

Figure 3:
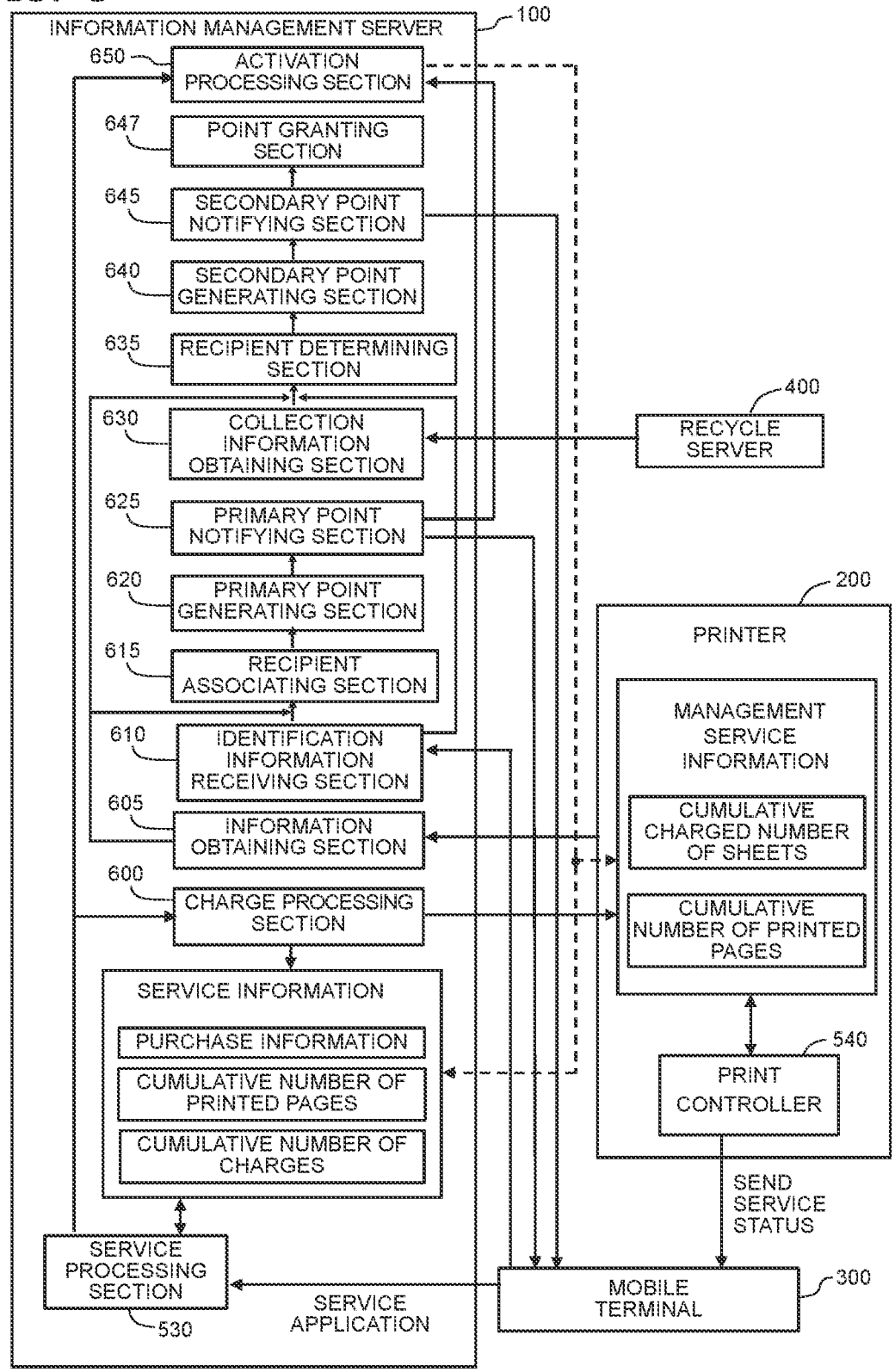
FIG. 3 is a software block diagram for various processes in the embodiment.

The software block configuration for the various processes, such as the above-mentioned point grant and authentication is depicted in FIG. 3.

Service Processing Section of the Management Server

As depicted in FIG. 3, the information management server 100 has the service processing section 530. As an example, the service processing section 530 is configured with the processor 110 described above and a corresponding portion of the program stored in the program storage area 131.

The service processing section 530 of the information management server 100 accepts applications for the above printing services and the like from the user via the mobile terminal 300, and executes appropriate processes necessary to provide each service while referring to the latest service information. The service information is the information stored in the service information storage area 123 in the volatile memory 120 of the information management server 100 depicted in FIG. 1A. The service information includes, in this example, the cumulative charged number of sheets, the cumulative number of printed pages, and purchase information indicating what billing plan was purchased by what user and when, etc.

The cumulative charged number of sheets is the cumulative value from the past to the present of the charged number of sheets, which is guaranteed by the purchase of a single billing plan, as described above. The cumulative number of printed pages is information that manages how many sheets of the cumulative charged number of sheets that the user has charged in the past have actually been printed, or in other words, how much of the number of printable pages that the above printing authority guarantees has actually been printed. The service processing section 530 of the information management server 100 registers the corresponding purchase information when the user purchases the billing plan. The service processing section 530 stores the user ID corresponding to the purchase information in the user ID storage area 121 by associating the user ID with the purchase information.

Print Controller of the Printer

The printer 200 has a print controller 540. As an example, the print controller 540 is configured with the aforementioned processor 210 and a corresponding part of the program stored in the program storage area 232. The print controller 540 of the printer 200 controls printing operations of the printing unit 290 according to instructions from the mobile terminal 300 or other terminal device, based on management service information. The management service information is information stored in the service information storage area 221 in the volatile memory 220 of the printer 200 depicted in FIG. 1B. The management service information includes the cumulative charged number of sheets and the cumulative number of printed pages. The service information is backed up in an undepicted rewritable nonvolatile memory such that the service information is not lost when the printer 200 is turned off. The print controller 540 also has a function of transmitting the service status including the contents of the management service information at that time, to the mobile terminal 300 and presenting the service status to the user.

Updating Service Information by the Printer and the Management Server

The cumulative number of printed pages is generated and modified by the printer 200, which actually performs print control. The cumulative charged number of sheets is generated and modified by the information management server 100, which accepts and processes the charge.

The information management server 100 needs to manage the cumulative number of printed pages in the printer 200 in real time as much as possible in order to perform a receiving process of the printing service. On the other hand, the printer 200 needs to limit the number of sheets that can be printed within the charged number of sheets actually ordered. Therefore, the information management server 100 and printer 200 synchronize and update the respective information by sending and receiving data to and from each other on a regular basis, for example, at an appropriate cycle. Specifically, information including the cumulative charged number of sheets is sent from the information management server 100 to the printer 200 by a charge processing section 600. Information including the cumulative number of printed pages is sent from the printer 200 to the information management server 100. The contents of the information received by each are updated.

The print controller 540 of the printer 200 manages to print only within the printable number of pages, which is obtained by subtracting the cumulative number of printed pages from the cumulative charged number of sheets of the management service information stored by the printer 200 at that time. When actually printing, the print controller 540 updates the cumulative number of printed pages in the management service information to be counted up by the number of printed pages. For example, the print controller 540 can output a displaying signal to warn and display a charge-zero status, when the charged number of sheets that can be printed with the charged amount is completed, i.e., when the cumulative number of printed pages counted up reaches the cumulative charged number of sheets. The charge-zero status indicates that the number of printable pages has become zero.

Other Functional Sections of the Information Management Server

The information management server 100 further includes the charge processing section 600, an information obtaining section 605, an identification information receiving section 610, a recipient associating section 615, a primary point generating section 620, a primary point notifying section 625, a collection information obtaining section 630, a recipient determining section 635, a secondary point generating section 640, a secondary point notifying section 645, a point granting section 647, and an activation processing section 650. As an example, these functional sections 600-650 are respectively configured by the processor 110 and corresponding parts of the program stored in the program storage area 131.

Charge Processing Section

The charge processing section 600 adds the value of the charged number of sheets corresponding to the billing plan to the value of the cumulative charged number of sheets in the management service information of the printer 200, in response to receiving the purchase application for the above billing plan from the mobile terminal 300. The charge processing section 600 also updates the content of the cumulative charged number of sheets by adding the value of the charged number of sheets corresponding to the billing plan to the value of the cumulative charged number of sheets in the service information of the information management server 100, in response to the addition of the cumulative charged number of sheets in the management service information of the printer 200. The charge processing section 600 stores the device number of the printer 200 corresponding to the cumulative charged number of sheets in the device number storage area 122, linking the device number to the cumulative charged number of sheets.

Information Obtaining Section

The information obtaining section 605 obtains a cartridge ID, which is identification information of the ink cartridge 50 installed in the printer 200, from the printer 200. The cartridge ID is information unique to each ink cartridge 50, and one ink cartridge 50 is identified by the cartridge ID. The information obtaining section 605 also obtains ink empty information, which corresponds to the degree of consumption of the ink cartridge 50, i.e., the degree of ink depletion. The ink empty information indicates that the remaining ink level has become not more than a predetermined threshold. The cartridge ID and the ink empty information can be obtained, for example, by the communication section (not depicted) in the printer 200 by reading the cartridge ID and the ink empty information from a memory (not depicted) such as an IC chip in the ink cartridge 50 through communication. The memory in the ink cartridge 50 is an example of the consumables memory.

Identification Information Receiving Section

The identification information receiving section 610 receives an application from the mobile terminal 300 to register an offer of the ink cartridge 50 to a collection destination, namely the recycle company. The identification information receiving section 610 also obtains the cartridge ID of the ink cartridge 50, based on a result of reading a bar code, etc. on the ink cartridge 50 by a scanner of the mobile terminal 300, or inputted by the user at the mobile terminal 300. The identification information receiving section 610 receives a user ID associated with the mobile terminal 300 in advance at the time of receiving the cartridge ID from the mobile terminal 300. The cartridge ID of the ink cartridge 50 received at this time is an example of the consumables identification information, and the user ID is an example of the first identification information.

Recipient Associating Section

The recipient associating section 615 associates the cartridge ID received by the identification information receiving section 610 with a recipient of points related to printing by using the printer 200. In this embodiment, the user is an example of the recipient of the points. In response to receiving the user ID of the mobile terminal 300 by the identification information receiving section 610, the recipient associating section 615 associates the cartridge ID received by the identification information receiving section 610 with the user ID. The recipient associating section 615 also check whether the cartridge ID obtained by the information obtaining section 605 and the cartridge ID included in the registration application received by the identification information receiving section 610 match each other.

Primary Point Generating Section

The primary point generating section 620 generates primary points, which are privileges related to the printing by using the printer 200, in response to the registration application received by the identification information receiving section 610. In detail, the primary point generating section 620 generates the primary points when the two cartridge IDs mentioned above match in the check by the recipient associating section 615.

Primary Point Notifying Section

The primary point notifying section 625 sends a registration notice to the mobile terminal 300 indicating that the registration application was received by the identification information receiving section 610, and indicating the cartridge ID of the registered ink cartridge 50.

Upon receiving the above notice, the mobile terminal 300 displays the corresponding information on the displaying unit 301. An example of the displaying unit 301 of the mobile terminal 300 is depicted in FIG. 4A.

As depicted in FIG. 4A, in this example, displaying screen 301A of the registration notice is displayed on displaying unit 301. The display screen 301A displays a date of the notification, the user ID, and the cartridge ID of the ink cartridge 50. The display screen 301A also displays a message including the contents of the above primary point awarded. An example of the message is "The following cartridge has been registered for collection and 100 pt of points have been awarded."

In this example, on the display screen 301A of the registration notice, the user can select whether or not to check the contents of the points corresponding to the grant of the primary point. In other words, the display screen 301A includes a "CHECK POINTS" button 311a and a "I WON'T CHECK NOW" button 311b. For example, when the user operates the "CHECK POINTS" button 311a, a confirmation screen depicting the numerical value of the primary points granted, the numerical value of the total with the past points, etc. is displayed on the display screen 301A, or on another screen that transitions from the display screen 301A, or in another window that is interrupted on the display screen 301A, etc. For example, if the user operates the "I WON'T CHECK NOW" button 311b, the above confirmation screen is not displayed and the screen returns to the prescribed initial screen.

When the notification is sent from the primary point notifying section 625 to the mobile terminal 300, a notice may also be sent to the mobile terminal 300 advising that the secondary points described below will be generated and granted in response to the collection at the recycle company of the ink cartridge 50 for which the registration application has been submitted.

Collection Information Obtaining Section

Returning to FIG. 3, the collection information obtaining section 630 obtains a collection information indicating that the ink cartridge 50, for which the registration application has been made, has been collected by the recycle company, from the recycle server 400. The recycle company is an example of the collection destination.

The collection information includes, for example, COB information described below, which is read from the memory (not depicted) such as the IC chip in the ink cartridge 50 and obtained by the recycle server 400. Alternatively, the collection information may be information including COB information obtained by a reading device of the recycle server 400 based on a reading result of the bar code, etc. attached to the ink cartridge 50 or the package of the ink cartridge 50. As described below, the obtained COB information includes the cartridge ID of the collected ink cartridge 50.

The collection information also includes status information of the ink cartridge 50. The status information indicates, for example, that the ink cartridge 50 is dirty, at least partially damaged, or in some other state that affects obtaining the COB information, and is manually input by a person in charge of the business via the operating unit 450 of the recycle server 400.

Recipient Determining Section

The recipient determining section 635 determines the user of the mobile terminal 300 or the printer 200 as a recipient of corresponding points with respect to the cartridge ID included in the collection information obtained by the collection information obtaining section 630, with reference to the association result by the recipient associating section 615. In this embodiment, the recipient associating section 615 associates the user ID with the cartridge ID as described above. Therefore, the recipient determining section 635 finally associates the points with the user ID as described below by determining the user as the recipient of the points. In a case of the user being the recipient of the points, the user can use the points for devices other than the printer 200 and services related to the prepaid printing service. The recipient determining section 635 also checks whether the cartridge ID obtained by the information obtaining section 605, the cartridge ID included in the registration application received by the identification information receiving section 610, and the cartridge ID included in the collection information obtained by the collection information obtaining section 630 match each other.

Secondary Point Generating Section

The secondary point generating section 640 generates secondary points, which are privileges related to the printing using the printer 200, according to the above collection information obtained by the collection information obtaining section 630. The secondary points are an example of the privilege information. The entirety of the primary and secondary points may be treated as the privilege information. Alternatively, generation of the primary points may be omitted and only the secondary points may be generated as the privilege information.

Secondary Point Notifying Section

The secondary point notifying section 645 sends a notification to the mobile terminal 300. The notification indicates that the ink cartridge 50 has been collected by the recycle company, that the secondary points have been generated by the secondary point generating section 640, and the cartridge ID of the registered ink cartridge 50.

Upon receiving the above notification, the mobile terminal 300 displays corresponding information on the displaying unit 301. FIG. 4B depicts an example of the displaying unit 301 of the mobile terminal 300.

As depicted in FIG. 4B, in this embodiment, displaying screen 301B of the collection notice is displayed on the displaying unit 301. In the display screen 301B, a date of the notification, the user ID, and the cartridge ID of the ink cartridge 50 are displayed, similar to the display screen 301A. The display screen 301B also displays a message including the contents of the secondary points granted. An example of the message is "The following cartridge registered earlier has been collected and additional 100 pt of points have been awarded."

In this example, the user can also select whether or not to confirm the points corresponding to the aforementioned secondary points on the display screen 301B of the collection notice. In other words, the display screen 301B includes a "CHECK POINTS" button 311a and a "I WON'T CHECK NOW" button 311b, which are similar to the aforementioned display screen 301A. For example, when the user operates the "CHECK POINTS" button 311a, a confirmation screen depicting the secondary points awarded, the total of the secondary points and the aforementioned primary points, the total value of the secondary points, the aforementioned primary points, and past points, etc. is displayed on the display screen 301B, or on another screen that is transferred from the display screen 301B, or in another window that interrupts the display screen 301B, etc. For example, if the user operates the "I WON'T CHECK NOW" button 311B, the above confirmation screen is not displayed, and the display returns to the prescribed initial screen.

Point Granting Section

Returning to FIG. 3, the point granting section 647 grants the primary and secondary points generated by the primary point generating section 620 and the secondary point generating section 640 to either the user or the printer 200 associated with the cartridge ID as the recipient of the points, based on the determination made by the recipient determining section 635. In this embodiment, the point granting section 647 associates the primary and secondary points generated by the primary point generating section 620 and the secondary point generating section 640 with the user ID based on the determination made by the recipient determining section 635.

Activation Processing Section

The activation processing section 650 activates the primary and secondary points in a user-utilizable manner at a predetermined timing after the generation of secondary points by the secondary point generation section 640 described above. For example, the primary and secondary points are generated by the primary point generation section 620 and the secondary point generation section 640, respectively, and added up to each other. However, until the activation processing by the activation processing section 650 is completed, the user cannot utilize the primary and secondary points as his/her own benefits in any way.

Control Procedure

Figure 5B:
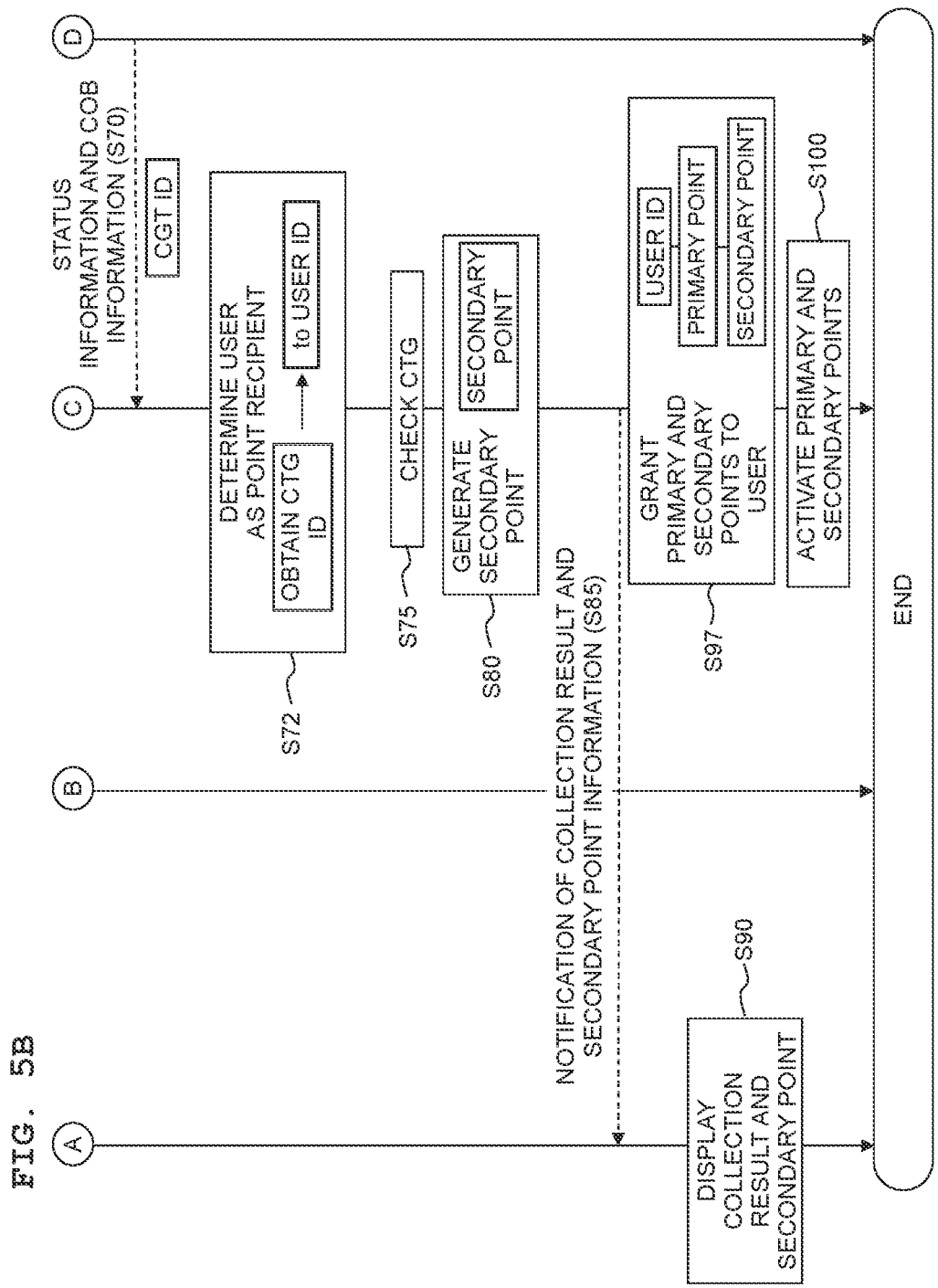

The following sequence charts in FIGS. 5A and 5B illustrate an example of a control procedure executed by the mobile terminal 300, the information management server 100, the recycle server 400, and the printer 200 in cooperation to achieve the above method. Hereinafter, "CTG" written in FIGS. 5A, 5B, etc. is an abbreviation of "cartridge".

In S4 of FIG. 5A, when the printer 200 is turned on with the ink cartridge 50 installed, the communicating unit (not depicted) in the printer 200 reads and obtains information stored in a memory (not depicted) such as the IC chip included in the ink cartridge 50, by communication. The information obtained in this way is depicted by the abbreviation of "COB information". The COB information includes the cartridge ID for identifying the ink cartridge 50. The obtained COB information, together with a device number unique to the printer 200, is sent to the information obtaining section 605 of the information management server 100. The obtained cartridge ID is stored in the cartridge ID storage area 124 and the obtained device number is stored in the device number storage area 122, while being associated with each other. When a known mechanism in the printer 200 detects that the remaining ink level of the ink cartridge 50 installed in the printer 200 has become not more than the above threshold value, the corresponding ink empty information is sent from the printer 200 together with the cartridge ID and the device number. In the information management server 100, at S5, the information obtaining section 605 obtains the ink empty information, and the ink empty information is stored in the cartridge empty information storage area 126 in association with the device number and the cartridge ID. At this time, at least one of the device number of the printer 200 and the cartridge ID of the ink cartridge 50 is associated with the corresponding user ID in the information management server 100, for example, when the aforementioned prepaid printing service contract is concluded (not depicted). In S5, the user ID is obtained based on the device number or the cartridge ID, and the user ID is stored in the user ID storage area 121. The information stored in the storage areas 126, 124, 122, and 121 in S4 and S5 is stored in each area in a mutually linked manner.

In S10, an OK notification is sent from the information obtaining section 605 of the information management server 100 to the printer 200. The OK notification indicates that the process in S5 has been completed.

When the user recognizes that the ink level in the ink cartridge 50 installed in the printer 200 has decreased to some extent, and performs an appropriate operation on the mobile terminal 300, an application program for ink cartridge collection that has already been installed in advance is started in S15.

When the user performs an appropriate operation, the displaying unit 240 of the printer 200 displays the cartridge ID attached to the ink cartridge 50 as a bar code, serial number, or the like. In S20, the user reads the bar code, etc. displayed in the displaying unit 240 of the printer 200 by using the reader of the mobile terminal 300, and the corresponding cartridge ID is obtained by the mobile terminal 300 in S25. The cartridge ID may be obtained by a manual input of the serial number via the operating section 350 of the mobile terminal 300. The process executed by the mobile terminal 300 in S20 is an example of the identification information obtaining process. The mobile terminal 300 is an example of the information handling apparatus.

In S25, the cartridge ID obtained in S20 and the user ID associated with the mobile terminal 300 in advance are sent from the mobile terminal 300 to the information management server 100 and received by the identification information receiving section 610 of the information management server 100. The received cartridge ID is stored in the cartridge ID storage area 124. The sending of the cartridge ID and the user ID in S25 is an indication of the user's intention to offer the ink cartridge 50 for collection by the recycle company, and is a registration application of the corresponding cartridge ID to the information management server 100. At this time, in the information management server 100, a collection flag Fa of collection/recycle flags corresponding to the ink cartridge 50 is set to "1", and the collection flag is stored in the collection/recycle flag storage area 125 in association with the cartridge ID of the ink cartridge 50. The process executed by the mobile terminal 300 in S25 is an example of the identification information sending process, and the process executed by the identification information receiving section 610 in S25 is an example of the identification information receiving process. The user ID is an example of the first identification information.

In S28, the recipient associating section 615 of the information management server 100 associates the cartridge ID of the ink cartridge 50 with the user being the recipient of the points, by associating the cartridge ID and the user ID received in S25 with each other. The process executed by the recipient associating section 615 is an example of the recipient associating process.

In the information management server 100, at S35, the recipient associating section 615 checks whether the cartridge ID stored in the cartridge ID storage area 124 at S4 and the cartridge ID stored in the cartridge ID storage area 124 at S25 match each other. In S35, the ink empty information obtained in S5 and stored in the cartridge empty information storage area 126 is read, and checked by the first check section 615 to see if the predetermined conditions are met. The predetermined condition is set to be that the amount of ink remaining in the ink cartridge 50 is close to empty, not more than a predetermined value, or the like. The reason is that if there is still ink remaining in the ink cartridge 50, it should be used up as much as possible, and it is undesirable to increase the number of collections and recycles even though the ink cartridge 50 can still be used, in order to reduce the environmental burden.

If the two cartridge IDs stored in the cartridge ID storage area 124 at S4 and S25 match in the check in S35 and the ink empty information meets the above predetermined conditions in the check in S35, the primary point is generated by the primary point generating section 620 in S40. It is sufficient to determine the size of the numerical value of the generated primary points according to, for example, the attributes of the user, the contract, the usage pattern, the type of ink cartridge 50, and other factors as appropriate. The generated primary points are stored in the point information storage area 127 while being associated with, for example, the cartridge ID or the user ID. Although not depicted in the figures, if the two cartridge IDs do not match in S35, or if the ink empty information does not meet the above predetermined conditions in S35, a predetermined error process is performed and no primary point is generated.

In S45, a notification indicating that registration has been made in response to the registration application in S25, that the primary point has been generated in S40, and the cartridge ID of the registered ink cartridge 50 is sent from the primary point notifying section 625 to the mobile terminal 300.

At S50, the mobile terminal 300 that received the notification displays the registration result, the primary point, and the cartridge ID of the registered ink cartridge 50, as illustrated in FIG. 4A. After confirming the display, the user ships the registered ink cartridge to the recycle company, for example, by mail (illustrated as S55 for convenience). When the shipped ink cartridge 50 arrives at the recycle company, the ink cartridge 50 is collected. The collected ink cartridge 50 is subjected to a prescribed recycle process as depicted in FIG. 2C at the recycle plant of the recycle company. Although a detailed explanation is omitted, the recycle process consists of one or more prescribed recycle processes that are performed sequentially according to the condition of the ink cartridge 50 to be recycled.

For the collected ink cartridge 50, the COB information is read by the recycle server 400 at S60. As described above, the COB information is read and obtained from the memory in the ink cartridge 50, or obtained based on the reading result of the bar code attached to the ink cartridge 50 or the package of the ink cartridge 50. The COB information also includes the cartridge ID of the ink cartridge 50 collected. At S65, an input of status information of the ink cartridge 50 is received, for example, via the operating section 450 of the recycle server 400. The status information is, as described above, information indicating, for example, that the ink cartridge 50 is dirty, at least partially damaged, or some other condition that affects obtaining of the COB information. The status information may be automatically obtained by the recycle server 400 according to a predetermined status amount detected in the recycle process at the recycle plant, the number of processes required for the ink cartridge 50 among multiple recycle processes, etc. The COB information and the status information obtained by the recycle server 400 in S60 and S65 are sent to the information management server 100 in S70.

In the information management server 100, the collection information obtaining section 630 receives and obtains the COB information and the status information sent from the recycle server 400 in S70. The obtained COB information is stored in the COB information storage area 128 and the obtained status information is stored in the status information storage area 129, each associated with the cartridge ID or the user ID, for example. The cartridge ID included in the obtained COB information is stored in the cartridge ID storage area 124. The process executed by the collection information obtaining section 630 at S70 is an example of the collection information obtaining process. At that time, the collection flag Fa among the collection/recycle flags is set to "0", and instead, the recycle flag Fb is set to "1".

In S72, the recipient determining section 635 determines the user ID associated with the cartridge ID of the ink cartridge 50 at S28 as the recipient of the points. The process executed by the recipient determining section 635 in S72 is an example of the recipient determining process.

In S75, the recipient determining section 635 checks whether the cartridge ID stored in the cartridge ID storage area 124 in S4, the cartridge ID stored in the cartridge ID storage area 124 in S25, and the cartridge ID obtained in S70 from the COB information and stored in the cartridge ID storage area 124 match each other.

If the aforementioned three cartridge IDs match in the check at S75, the secondary point generating section 640 generates the secondary points at S80. It is sufficient to determine the size of the numerical value of the generated secondary points according to, for example, the attributes of the user, the contract, the usage pattern, the type of ink cartridge 50, and other factors as appropriate, similar to the primary points. The generated secondary points are stored in the point information storage area 127 while being associated with, for example, the cartridge ID or the user ID. The process executed by the secondary point generating section 640 at S80 is an example of the privilege information generating process. Although not depicted in the figures, if the three aforementioned cartridge IDs do not match in S75, a predetermined error process is performed and no secondary point is generated.

The three cartridge IDs of the cartridge ID obtained and stored in S4, the cartridge ID obtained and stored in S25, and the cartridge ID obtained and stored in S70 may not be checked at S75. In other words, at S75, the recipient determining section 635 may check only two of the cartridge IDs: the cartridge ID obtained and stored in S25 and the cartridge ID obtained and stored in S70. In this case, if the two cartridge IDs match in the check at S75, the secondary point is generated by the secondary point generating section 640 at S80.

In S85, a notification indicating that the collection of the ink cartridge 50 has been made in S55 as described above, that the secondary point has been generated in S80, and the cartridge ID of the registered ink cartridge 50 is sent from the secondary point notifying section 645 to the mobile terminal 300.

In S90, if the mobile terminal 300 receives the notification, the mobile terminal 300 displays the collection results, the secondary point, and the cartridge ID of the ink cartridge 50, as illustrated in FIG. 4B. The process executed by the mobile terminal 30 at S90 is an example of the first displaying process.

In S97, the point granting section 47 of the information management server 100 associates the primary point generated in S40 and the secondary point generated in S80 with the user ID of the user determined as the recipient of the points in S72, and the primary and secondary points are granted to the user. The process executed by the point granting section 647 is an example of the privilege information granting process.

In S100, the activation processing section 650 activates the primary and secondary points in a manner that the user can utilize them. The process executed by the activation processing section 650 at S100 is an example of the activation process. As a result of the activation, the user can utilize the primary and secondary points as his/her own benefits in some form. In other words, the user is allowed to use all or part of the above totaled primary and secondary points. The fact that the points have been activated and can be used in this manner is stored in the service information storage area 123 in association with the corresponding user ID or the corresponding cartridge ID, for example. At this time, the activation processing section 650 reduces the value of the points stored in the point information storage area 127 by the amount of points that have been activated in a manner that allows the user to utilize them. As a method of utilization by the user, the user may be able to use the points as an addition to the aforementioned charged number of sheets by the information management server 100, as described above. Alternatively, in addition to the charged number of sheets, the user may be able to use the points as some kind of provision to the user, such as money, various services, various products, etc.

Effects of Embodiment

In the embodiment described above, the cartridge ID is held by the ink cartridge 50, and the print service delivery system 1 includes the mobile terminal 300 handling the cartridge ID and the information management server 100 which can communicate with the mobile terminal 300. In S20, the cartridge ID of one ink cartridge 50 to be processed is obtained by the mobile terminal 300. The obtained cartridge ID is sent to the information management server 100 in S25. The cartridge ID is received by the information management server 100, and the received cartridge ID is associated with the recipient of the points in S28, with the user ID in the embodiment.

When the ink cartridge 50 after use is collected by the recycle company, the collection information from the recycle company is obtained by the information management server 100. In response to the collection information obtained, the privilege information such as so-called points is generated in S80. The collection information from the collection company includes the cartridge ID of the collected ink cartridge 50. In S72, with reference to the association result in S28, the recipient of the corresponding points is determined with respect to the cartridge ID of the collected ink cartridge 50. In S97, the generated points are granted in a manner associated with the determined recipient.

In this embodiment, the points are generated by using the cartridge ID held by the ink cartridge 50, and the generated points are granted to the recipient determined by using the cartridge ID. According to the embodiment, the ink cartridge 50 and the points corresponding to the ink cartridge 50 are associated with each other one to one by using the cartridge ID which is information unique to the ink cartridge 50. Therefore, the user can trace which collection of the ink cartridge 50 among multiple ink cartridges 50 causes the points, and user satisfaction can be improved. Further, since the cartridge ID held in the ink cartridge 50 is used, there is no need to store the user information in the memory of the ink cartridge 50, and there is no risk of the user information being extracted from the ink cartridge 50 during the collection and used illegally by a third party.

In this embodiment, the mobile terminal 30 obtains the cartridge ID of the ink cartridge 50 installed in the printer 200 in S20. Since the cartridge ID is sent to the information management server 100 after being obtained from the ink cartridge 50 installed in the printer 200, the subsequent processes can be executed by the information management server 100.

In this embodiment, the bar code information is displayed in the displaying unit 240 of the printer 200 in which the ink cartridge is installed. If the bar code information is read by the mobile terminal 300, the cartridge ID corresponding to the reading result is obtained by the mobile terminal 300 in S20. Alternatively, the cartridge ID is displayed in the displaying unit 240 of the printer 200 in which the ink cartridge is installed. If the displayed cartridge ID is manually inputted by the user via the operating unit 350 of the mobile terminal 300, the cartridge ID corresponding to the input result is obtained by the mobile terminal 300 in S20. According to this embodiment, the cartridge ID held by the ink cartridge 50 installed in the printer 200 can be obtained smoothly by using the mobile terminal 300.

In this embodiment, the information management server 100 associates the cartridge ID received in S25 and the user ID of the user of the mobile terminal 300 in S28, based on receiving the cartridge ID from the mobile terminal 300 in S25. Further, in S72, the information management server 100 determines the user as the recipient based on the association in S28. In S97, based on the determination result, the points are granted in a manner associated with the user ID. According to the embodiment, the information management server 100 can grant the points to the user smoothly based on receiving the cartridge ID from the mobile terminal 300.

In this embodiment, the mobile terminal 300 can inform the user in S90 that the ink cartridge 50 has been collected by the recycle company, the points have been granted, and the cartridge ID of the registered ink cartridge 50. This allows the user to easily confirm which collection of the ink cartridge 50 caused the points.

Modified Example

The present teaching is not limited to the above embodiment, and the following modified examples are also included in the technical scope. In the description of each of the following modified examples, parts equivalent to the above embodiment are marked with the same symbol, and the explanation is omitted or simplified as appropriate.

(1) In a Case of the Printer Being the Point Recipient

Figure 6A:
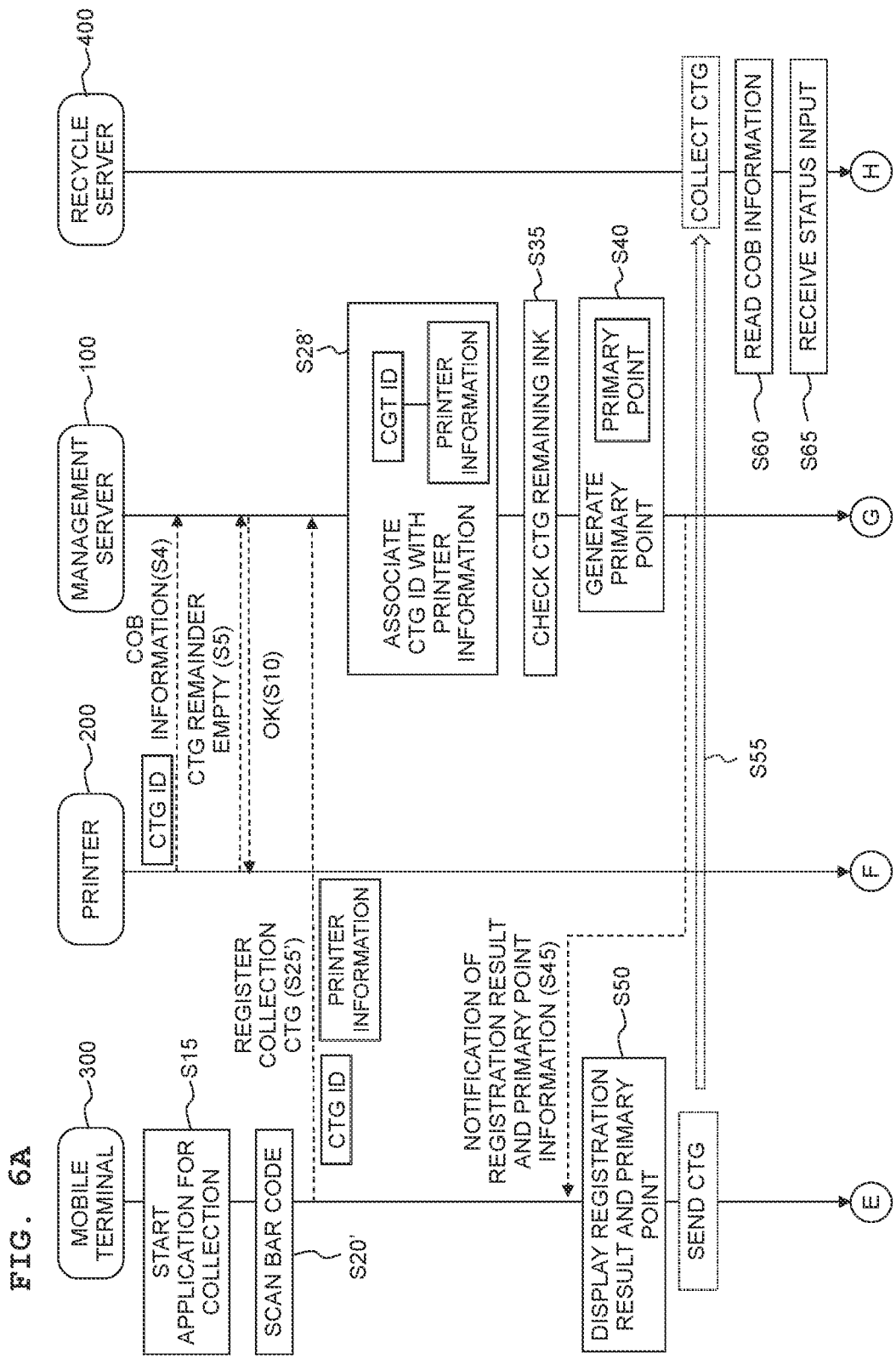

An example of a control procedure performed by the mobile terminal 300, the information management server 100, the recycle server 400, and the printer 200 working together to realize the method in this modified example is described by the sequence diagrams in FIGS. 6A and 6B, which correspond to FIGS. 5A and 5B in the above embodiment.

In this modified example, as depicted in FIG. 6A, after S4 to S15 as in FIG. 5A are executed, the mobile terminal 30 obtains the cartridge ID of the ink cartridge 50 and printer information of the printer 200 in S20' corresponding to S20 in FIG. 5A. The cartridge ID and the printer information are displayed in the displaying unit 240 of the printer 200 as a bar code, a serial number, or the like, in response to a predetermined operation by the user. The mobile terminal 300 obtains the cartridge ID and the printer information by reading through the reading unit by the user or a manual input through the operating unit 350. The printer information is an example of the second identification information. The process executed by the mobile terminal 300 in S20' is an example of the identification information obtaining process in this modified example. Also in this modified example, the mobile terminal 300 is an example of the information handling apparatus, and the cartridge ID is an example of the consumables identification information.

In S25' corresponding to S25 in FIG. 5A, the cartridge ID and the printer information obtained in S20' are sent from the mobile terminal 300 to the information management server 100 and received by the identification information receiving section 610 of the information management server 100. The received cartridge ID is stored in the cartridge ID storage area 124. The sending of the cartridge ID and the user ID in S25', as in S25, is the indication of the user's intention and is the registration application. At this time, in the information management server 100, the collection flag Fa corresponding to the ink cartridge 50 is set to "1" and stored in the collection/recycle flag storage area 125. The process executed by the mobile terminal 300 in S25' is an example of the identification information sending process in this modified example, and the process executed by the identification information receiving section 610 in S25' is an example of the identification information receiving process in this modified example.

In S28' corresponding to S28 in FIG. 5A, the recipient associating section 615 of the information management server 100 associates the cartridge ID of the ink cartridge 50 with the printer 200 as the recipient of the points, by associating the cartridge ID and the printer information received in S25' with each other. The process executed by the recipient associating section 615 in S28' is an example of the recipient associating process in this modified example. In this modified example, the printer 200 is an example of the recipient.

After S35 to S70 as in FIGS. 5A, 5B are executed, in S72' corresponding to S72 in FIG. 5B, the recipient determining section 635 determines the printer 200 as the recipient of the points corresponding to the association of the cartridge ID and printer information in S28'. In a case of the recipient of the points being the printer 200, for example, unspecified users can use the points for one printer 200 installed in an office, or the like. The process executed by the recipient determining section 635 in S72' is an example of the recipient determining process in this modified example.

After S75 to S90 as in FIG. 5B are executed, in S97' corresponding to S97 in FIG. the point granting section 647 grants the primary and secondary points to the printer 200 by associating the primary point generated in S40 and the secondary point generated in S80 with the printer information determined as the recipient of the points. The process executed by the point granting section 647 is an example of the privilege information granting process in this modified example. The subsequent process is the same as that in FIG. 5B, and explanation thereof is omitted.

Effects of the Modified Example

In this modified example, the same effect as the above embodiment can be obtained. In this modified example, the mobile terminal 300 obtains the cartridge ID and the printer information of the printer 200 in S20', based on the reading result, etc. of the bar code information displayed in the displaying unit 240 of the printer 200. The information management server 100 associates the cartridge ID and the printer information of the printer 200 received in S28', based on receiving the cartridge ID and the printer information of the printer 200 from the mobile terminal 300 in S5'. In S72', the printer 200 is determined as the recipient based on the association, and in S97', the points are granted to the printer 200 based on the determination result in a manner of associated with the printer information of the printer 200. According to this modified example, the information management server 100 can grant the points smoothly to the printer 200 based on the cartridge ID and the printer information received from the mobile terminal 300.

Figure 7:
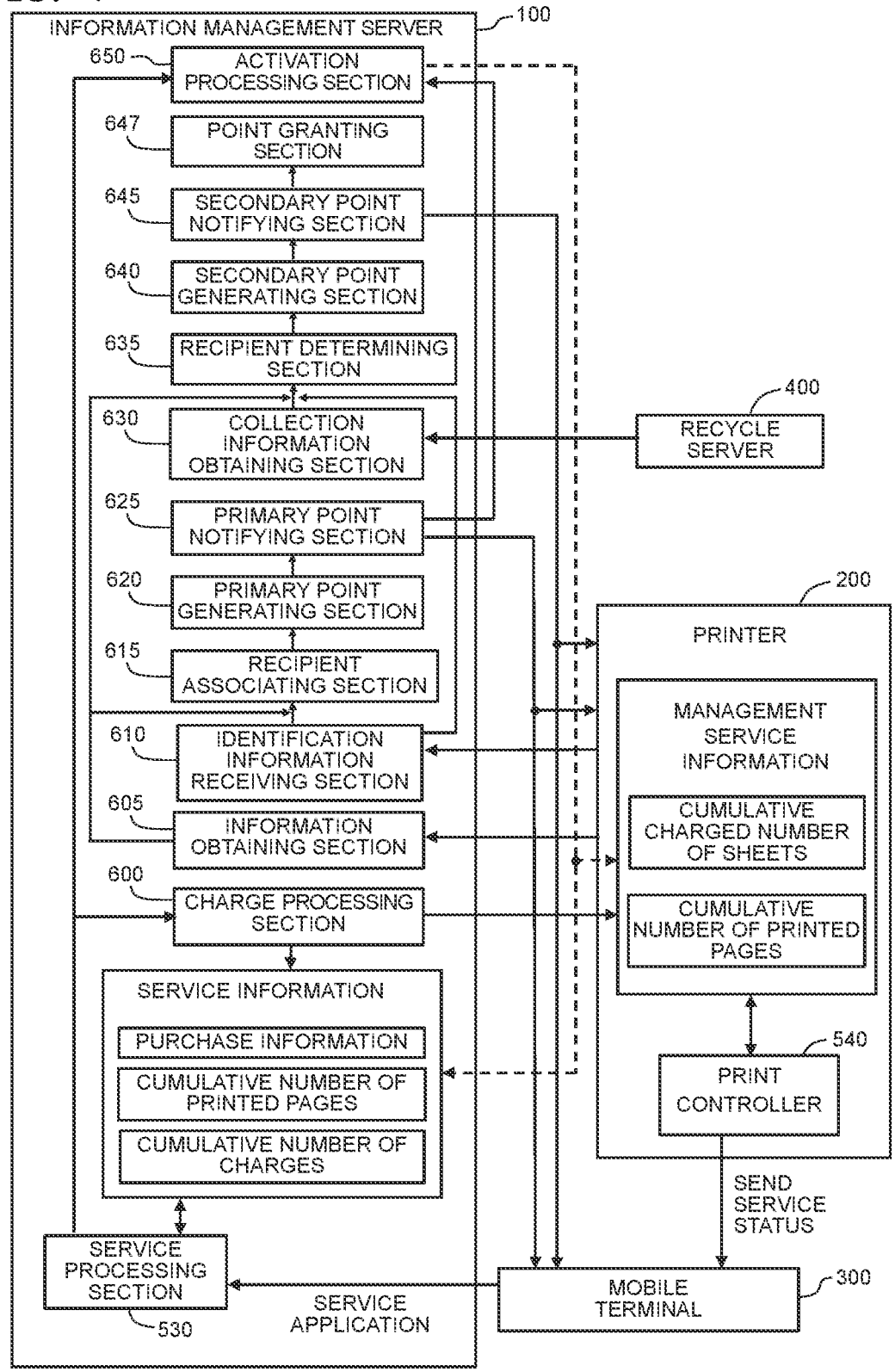
FIG. 7 is a software block diagram for various processes in a modified example where an information handling apparatus is the printer and the point recipient is the printer.

(2) In a Case of the Printer Being the Information Handling Apparatus and the Point Recipient In this modified example, an example of the software block configuration relating to various processes such as the above-mentioned point granting and authentication is depicted in FIG. 7 corresponding to FIG. 3 in the above embodiment. In this modified example, the flow of information pertaining to the identification information receiving section 610, the primary point notifying unit 625, and the secondary point notifying unit 645 is different from the above embodiment. An example of the control procedure performed by the mobile terminal 300, the information management server 100, the recycle server 400, and the printer 200 working together to realize the method in this modified example is described with reference to the sequence diagrams in FIGS. 8A and 8B corresponding to FIGS. 5A and 5B of the above embodiment and FIGS. 6A and 6B of the above modified example (1).

As depicted in FIG. 8A, in this modified example, after S4 to S10 as in FIG. 5A are executed, S25" corresponding to S25 in FIG. 5A is executed. In this modified example, the process executed by the printer 200 in S4 is an example of the communication obtaining process and also an example of the identification information obtaining process of the modified example. The printer 200 is an example of the information handling apparatus in this modified example.

In S25" corresponding to S25 in FIG. 5A, the printer 200 sends to the information management server 100 the cartridge ID read as described above, the printer information of the printer 200 itself, and recipient designation information for designating the recipient of the points to the printer 200. The recipient designation information is information for designating the recipient to which the points are to be awarded, and in this modified example, the printer 200 is designated as the recipient of the points. The recipient designation information is, for example, selected and input by the user in advance via the operating unit 250 of the printer 200, or is designated in advance by a billing plan or other means. The sending of the cartridge ID, the printer information, and the recipient designation information in S25" serves as both the indication of the user's intention and the application for registration, as in S25 and S25' above.

The cartridge ID, the printer information, and the recipient designation information are received by the identification information receiving section 610 of the information management server 100, and the received cartridge ID is stored in the cartridge ID storage area 124, and the collection flag Fa is set to "1", as described above. The process executed by printer 200 in S25" is an example of the identification information sending process and is also an example of the information sending process. The process executed by the identification information receiving section 610 of the information management server 100 in S25" is an example of the identification information receiving process in this modified example.

In S28" corresponding to S28 in FIG. 5A, the recipient associating section 615 associates the cartridge ID and printer information received in S25" with each other based on the recipient designation information received in S25". As a result, the cartridge ID of the ink cartridge 50 is associated with the printer 200 as the recipient of the points. The process executed by the recipient associating section 615 in S28" is an example of the recipient associating process in this modified example. In this modified example, the printer 200 is also an example of the recipient.

After S35 to S40 as in FIG. 5A are executed, S45' corresponding to S45 in FIG. 5A is executed. In S45', a notification indicating that the registration was made in response to the registration application in S25" and that the primary point was generated in S40 and the cartridge ID of the registered ink cartridge 50 is sent from the primary point notifying section 625 to the printer 200 in this modified example.

When the printer 200 receives the above notification, in S50' corresponding to S50 in FIG. 5A, the displaying unit 240 displays the registration result, the primary point, and the cartridge ID, as in FIG. 4A. At this time, the displaying unit 240 of the printer 200 also displays the shipping address of the ink cartridge 50, i.e., the address of the recycle company, etc. The process performed by the printer 200 at this time is an example of the collection destination displaying process.

After S55 to S80 similar to FIGS. 6A and 6B above are executed, S85' corresponding to S85 in FIG. 5B is executed. In S85', a notification indicating that the ink cartridge 50 has been collected in S55, that the secondary point has been generated in S80, and the cartridge ID of the registered ink cartridge 50 is sent from the secondary point notifying section 645 to the printer 200.

When the printer 200 receives the above notification, in S90' corresponding to S90 in FIG. 5B, the displaying unit 240 displays the collection results, the secondary points, and the cartridge ID, as in FIG. 4B above. The process executed by the displaying unit 240 of the printer 200 at this time is an example of the second displaying process and also an example of the privilege information displaying process.

The subsequent process is the same as that in FIG. 6B, and explanation thereof is omitted.

Effects of the Modified Example

In this modified example, the same effects as in the above embodiment are obtained. In particular, in this modified example, the cartridge ID is obtained from the memory of the ink cartridge 50 installed in the printer 200 by communication executed by the printer as the information handling apparatus in S4. According to this modified example, the printer 200 obtains the cartridge ID from the ink cartridge 50 in the installed state and then sends the cartridge ID to the information management server 100, so that the information management server 100 can execute the subsequent process.

In this modified example, as described above, the recipient of the points is designated based on the cartridge ID held in the ink cartridge 50, so the information management server 100 must determine the recipient based on the cartridge ID before finally granting the points. In this modified example, when the printer 200 executes S25", the printer information of the printer 200 and cartridge ID is sent to the information management server 100 together with the recipient designation information that designates the recipient of the points. According to this modified example, the printer 200 sends the recipient designation information to the information management server 100, so that the information management server 100 can smoothly determine the recipient of the points when determining the recipient in S72'.

In this modified example, in the recipient designation information received together with the cartridge ID and the printer information in S25", the printer 200 is designated as the recipient of the points. In S28", based on the designation, the cartridge ID received in S25" is associated with the printer information of printer 200. According to this modified example, based on the recipient designation information received from the printer 200, the recipient of points can be smoothly determined to be the printer 200 and the points can be granted to the printer 200.

According to this modified example, the printer 200 can also inform the user in S90' that the ink cartridge 50 has been collected at the collection destination and that the points have been awarded, as well as the cartridge ID pertaining to the registration.

Figure 9:
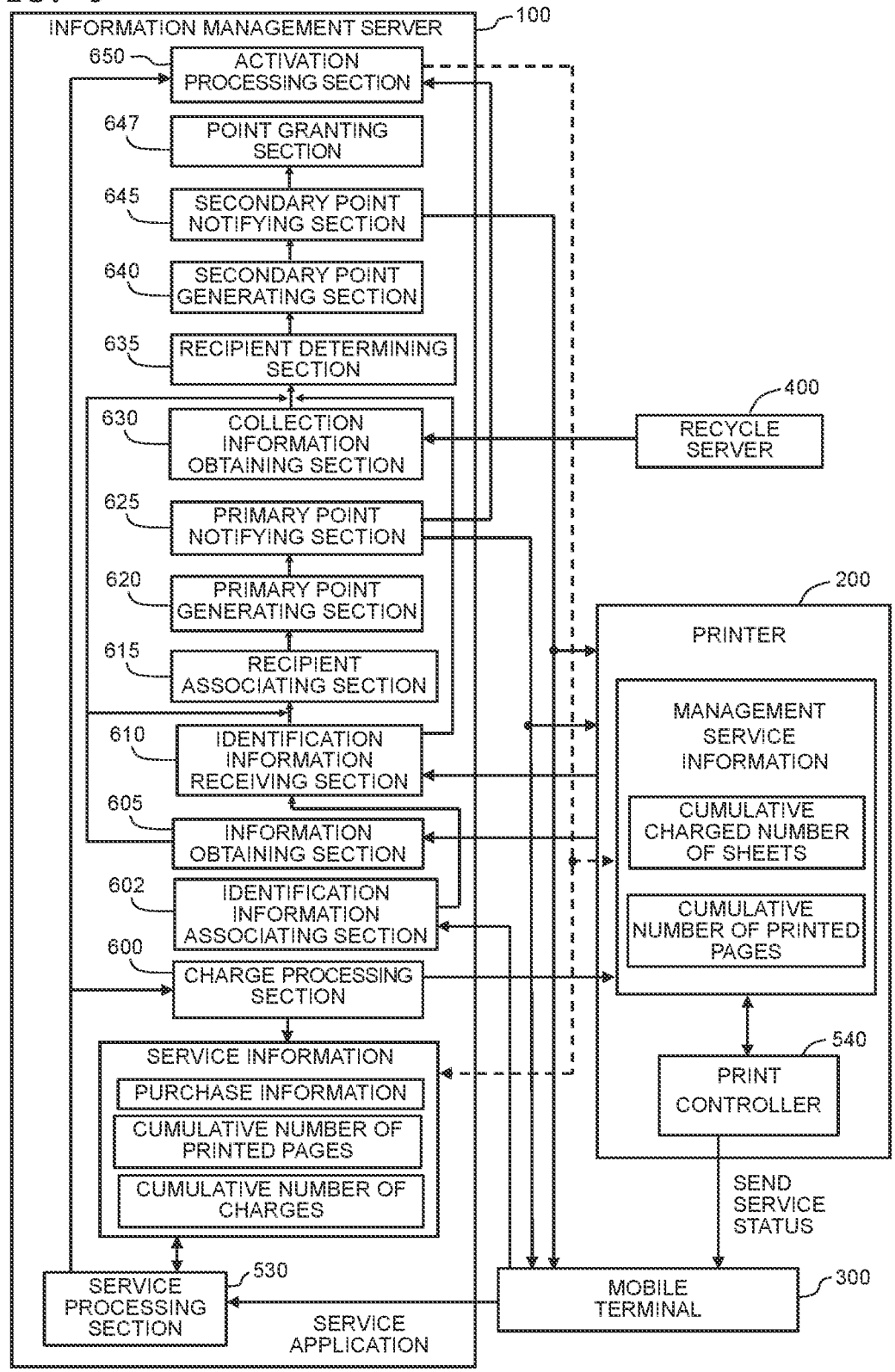
FIG. 9 is a software block diagram for various processes in a modified example where an information handling apparatus is the printer and the point recipient is a user.

(3) In a Case of the Printer Being the Information Handling Apparatus and the User Being the Point Recipient In this modified example, an example of the software block configuration for various processes such as the above-mentioned point granting and authentication is depicted in FIG. 9 corresponding to FIG. 3 in the above embodiment.

Identification Information Associating Section

In FIG. 9, the information management server 100 of this modified example is further provided with an identification information associating section 602. The identification information associating section 602 usually receives the printer information of the printer 200 and the user ID of the mobile terminal 300 sent from the mobile terminal 300 as a pre-registration by the user before the remaining ink in the ink cartridge 50 becomes not more than a predetermined threshold value. The identification information associating section 602 registers the printer information and the user ID received from the mobile terminal 300 in association with each other, and sends the printer information and the user ID to the identification information receiving unit 610.

Figure 10A:
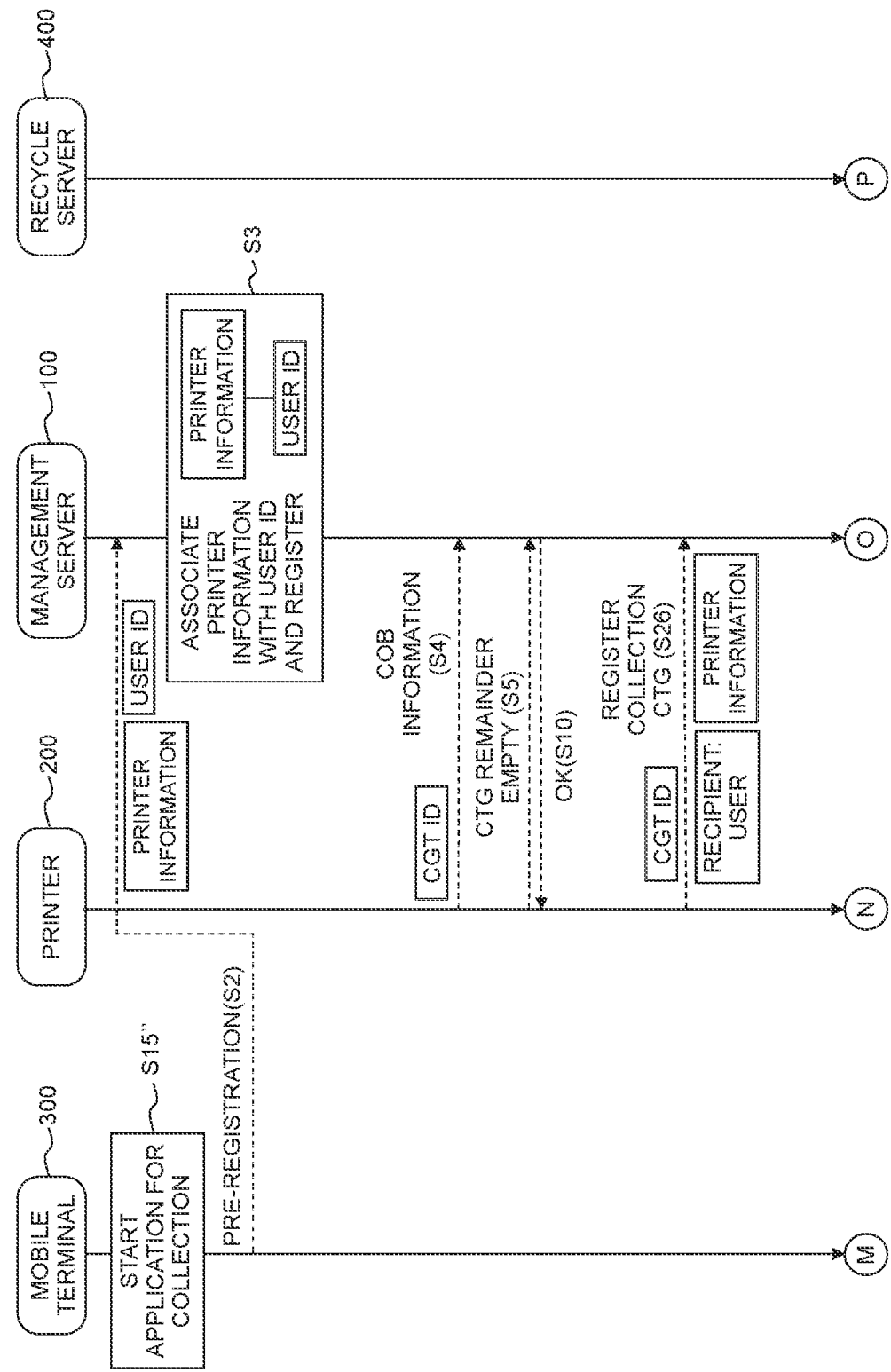
FIGS. 10A to 10C are a sequence chart depicting an example of a control procedure performed by the mobile terminal, the information management server, the recycle server, and the printer working together.
Figure 10B:
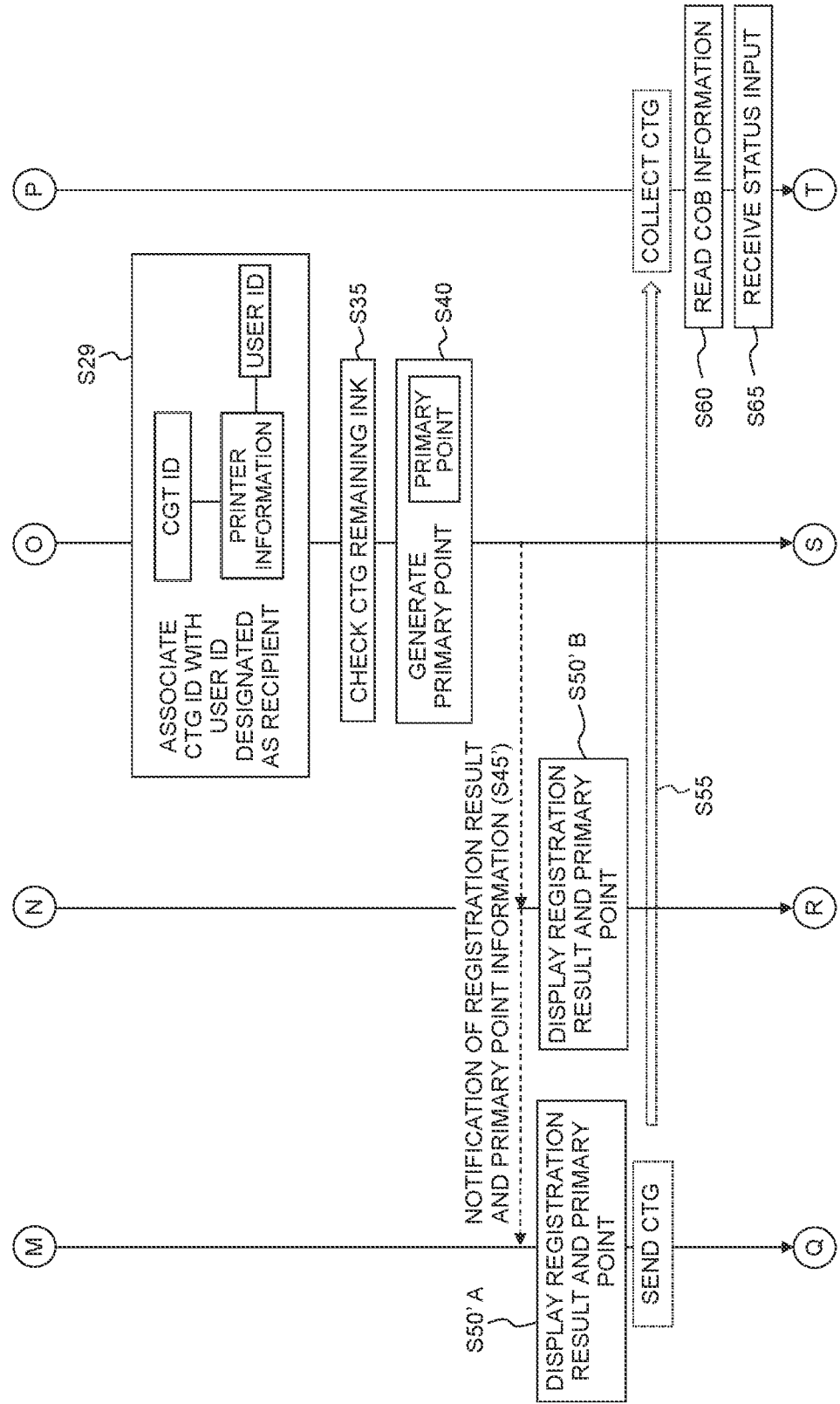
Figure 10C:
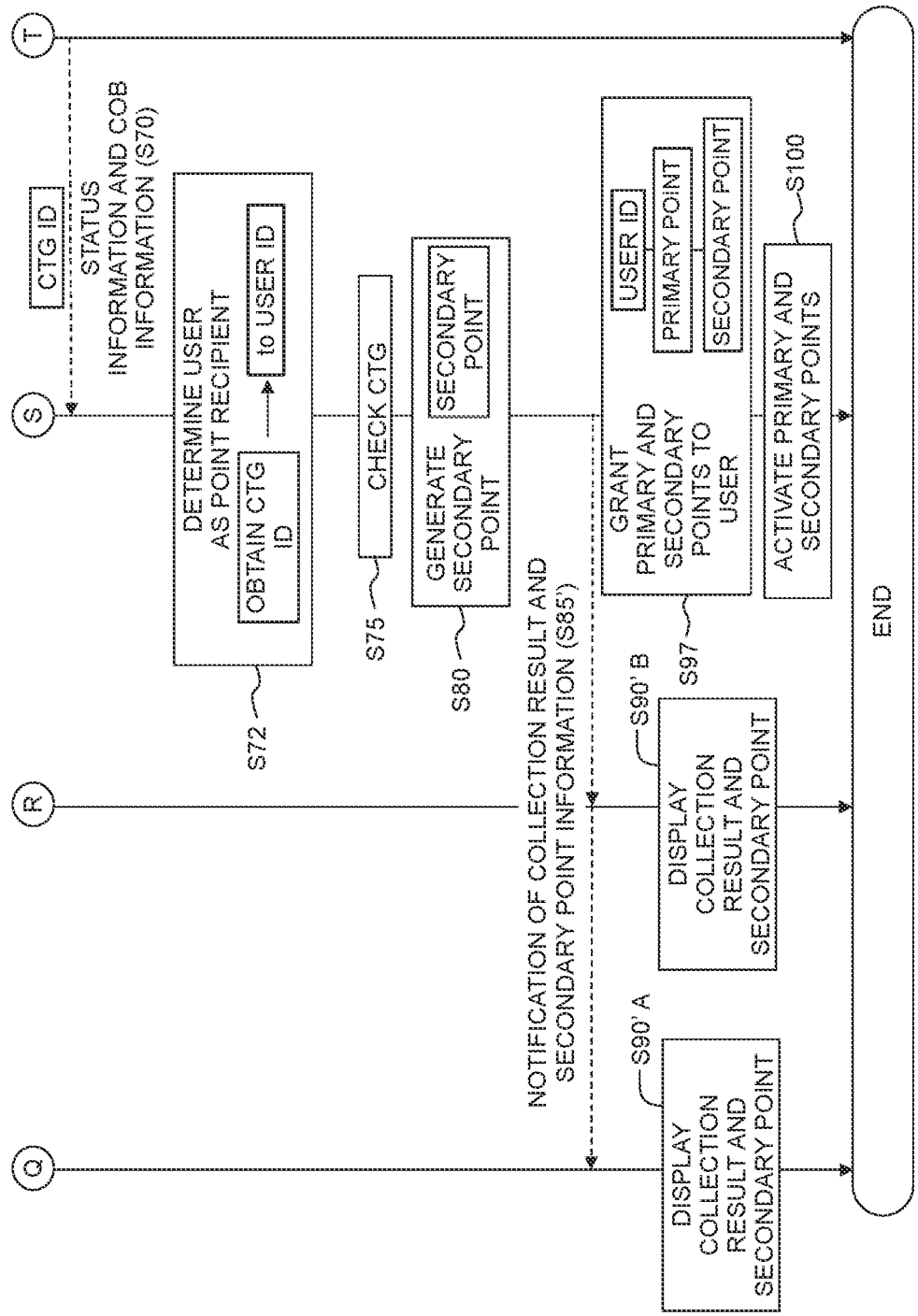

An example of the control procedure executed by the mobile terminal 300, the information management server 100, the recycle server 400, and the printer 200 in cooperation to realize the method in this modified example is illustrated by the sequence diagrams in FIGS. 10A to 10C, corresponding to FIGS. 5A and 5B in the above embodiment, FIGS. 6A and 6B in the above modified example (1), and FIGS. 8A and 8B in the above modified example (2).

In this modified example, in S15" corresponding to S15 in FIG. 5A, when the user who wishes to pre-register the collection of the ink cartridge 50 performs an appropriate operation on the mobile terminal 300, an application program for ink cartridge collection that has already been installed in advance on the mobile terminal 300 is started.

In S2, the user ID associated with the mobile terminal 300 in advance and the printer information of the printer 200 are sent from the mobile terminal 300 to the information management server 100 via the application program and received by the identification information associating section 602. The mobile terminal 300 obtains the printer information by reading the printer information displayed as a bar code, a serial number, or the like, in the displaying unit 240 of the printer 200 by an appropriate operation of the user or by input through the operating unit 350 of the mobile terminal 300. This process is a pre-registration by the user who wants to have the ink cartridge 50 collected.

In S3, the identification information associating section 602 of the information management server 100 registers the printer information received in S3 in association with the user ID. The process executed by the identification information associating section 602 in S3 is an example of the identification information associating process.

In S4 as in FIG. 8A, the COB information of the ink cartridge 50 is read by an appropriate operation to the printer 200 by the user, and the corresponding cartridge ID is obtained. The process executed by the printer 200 in S4 is an example of the identification information obtaining process in this modified example, and is also an example of the communication obtaining process in this modified example. The printer 200 is an example of the information handling apparatus in this modified example.

After S5 to S10 as in FIG. 8A are executed, in S26 corresponding to S25" in FIG. 8A, the cartridge ID, the printer information of the printer 200, and the recipient designation information designating the user as the recipient of the points are sent from the printer 200 to the information management server 100, and received by the identification information receiving section 610 of the information management server 100. In the recipient designation information in this modified example, the user is designated as the recipient of the points. The cartridge ID received at this time is stored in the cartridge ID storage area 124, and the collection flag Fa is set to "1" as described above. The process executed by the printer 200 in S26 is an example of the identification information sending process in this modified example, and the process performed by the identification information receiving section 610 is an example of the identification information receiving process in this modified example.

In S29 corresponding to S28" in FIG. 8A, based on the printer information of the printer 200 received in S26 and the user ID associated with the printer information of the printer 200 in S4, the recipient associating section 615 associates the cartridge ID received in S26 with the user ID registered in S4. As a result, the cartridge ID of the ink cartridge 50 is associated with the user designated as the recipient of the points. The process executed by the recipient associating section 615 in S29 is an example of the recipient associating process in this modified example.

After S35 to 40 as in FIG. 5A are executed, S45' similar to FIG. 8A is executed. However, in this modified example, a notification indicating that the aforementioned registration has been made, that the primary point has been generated, and the cartridge ID pertaining to the registration is sent from the primary point notifying section 625 to both the printer 200 and the mobile terminal 300. S50'B which is a process similar to S50' in FIG. 8A is executed, and a new S50'A is further executed. In S50'A, the mobile terminal 300 receives the above notification, and the displaying unit 301 of the mobile terminal 300 displays the registration result, the primary point, and the cartridge ID as illustrated using FIG. 4A. After S55 to S80 similar to FIGS. 5A and 5B are executed, S85' similar to FIG. 8B is executed. However, in this modified example, the aforementioned notification indicating that the ink cartridge 50 has been collected, that the secondary points have been generated, and the cartridge ID pertaining to registration is sent from the secondary point notifying section 645 to both the printer 200 and the mobile terminal 300. S90'B which is a process similar to S90' in FIG. 8B is executed, and a new S90'A is further executed. In S90'A, the mobile terminal 300 receives the above notification, and the displaying unit 301 of the mobile terminal 300 displays the collection results, the secondary points, and the cartridge ID pertaining to the registration as illustrated using FIG. 4B. The subsequent process is the same as depicted in FIG. 5B, and the explanation is omitted.

Effects of the Modified Example

In this modified example, the same effects as in the above embodiment are obtained. In particular, in this modified example, in S4 executed by the identification information associating section 602 of the information management server 100, the user ID of the user of the mobile terminal 300 is associated in advance with the printer information of the printer 200. In S26, the cartridge ID sent from the printer 200, the printer information of the printer 200, and the recipient designation information are received. In this modified example, the user is designated as the recipient of the points in the recipient designation information received together with the cartridge ID and the printer information of printer 200 in S26. In S29, based on the designation, the cartridge ID is associated with the user ID previously associated with the printer information, using the printer information of the printer 200 received together with the cartridge ID as described above as a key. According to this modified example, based on the recipient designation information received from the printer 200, the user can be smoothly determined as the recipient of the points and the points can be granted to the user.

(4) Others

The above description is based on the case of prepaid printing service as an example of a printing service, but it is not limited to this. For example, it may be a fixed price printing service (so-called subscription printing service), provided that the maximum number of sheets to be printed is not exceeded in a certain period of time. In this case, points may be used for printing not less than the maximum number of sheets. Alternatively, the fixed price may be discounted according to the points. It is also possible that the customer does not receive printing services under a printing service contract. Even in such cases, various benefits can be realized, such as discount coupons for consumables, provision of contents for printing applications, etc. In the above, the case in which printing is performed by an inkjet method is taken as an example, but this is not limited to this case. For example, a laser printer may be used instead of the inkjet printer. In this case, toner cartridges in which toner is stored, drums, etc., are examples of consumables. In addition to the above, inkjet heads to be replaced, waste liquid boxes, etc. are also included in the consumables and may be subject to point granting through collection.

In the above, the arrows depicted in FIGS. 3, 7, 9 are examples of signal flows and do not limit the direction of the signal flows.

In addition, the sequence charts depicted in FIGS. 5A, 5B, 6A, 6B, 8A, 8B, 10A to above are not limited to the procedures depicted in the sequence charts, and procedures may be added, deleted, or the order of procedures may be changed to the extent not to depart from the purpose and technical idea of the teaching.

In addition to the above already mentioned, the methods in the above embodiments and each modified example may be used in combination as appropriate.

In addition, although not exemplified, the present teaching can be implemented with various modifications within the scope of the teaching.

What is claimed is:

1. An information management system, comprising:
a printer configured to handle consumables identification information for identifying consumables to be used in printing by the printer; and
an information management apparatus configured to communicate with the printer via a network,
wherein the printer is configured to:
obtain the consumables identification information of one of the consumables from a consumables memory of the one of the consumables installed in the printer via a communication; and
send the consumables identification information, recipient designation information designating a recipient, and a first identification information of the printer to the information management apparatus, and
the information management apparatus is configured to:
receive at least the consumables identification information sent by the printer,
associate the consumables identification information received with a recipient to be granted privilege information relating to the printing by the printer;
obtain collection information of the one of the consumables in a collection destination of the consumables;
generate the privilege information in response to the collection information obtained;
determine a recipient of the privilege information with respect to the consumables identification information included in the collection information, in reference to a result of the association; and
grant the privilege information by associating with the determined recipient.

2. The information management system according to claim 1, wherein the information management apparatus is further configured to:
receive the recipient designation information, and the first identification information sent from the printer;
associate the consumables identification information with the first identification information as the recipient designated; and
determine the printer as the recipient with respect to the consumables identification information included in the collection information.

3. The information management system according to claim 1, wherein
the information management apparatus is configured to associate a second identification information of a user of a terminal device with the first identification information of the printer, and
the information management apparatus is further configured to:
receive the recipient designation information, and the first identification information sent from the printer;
associate the consumables identification information with the second identification information as the recipient designated, the second identification information being associated with the first identification information together with the consumables identification information; and
determine the user as the recipient with respect to the consumables identification information included in the collection information.

4. The information management system according to claim 1, further comprising a terminal device configured to display the one of the consumables has been collected in the collection destination and that the privilege information has been granted.

5. The information management system according to claim 1, wherein the printer is further configured to display the one of the consumables has been collected in the collection destination and that the privilege information has been granted in a displaying unit of the printer.

* * * * *